United States Patent
Kayama

(10) Patent No.: US 10,648,380 B2
(45) Date of Patent: May 12, 2020

(54) HONEYCOMB STRUCTURE BODY AND EXHAUST GAS PURIFICATION FILTER

(71) Applicant: DENSO CORPORATION, Kariya, Aichi-pref. (JP)

(72) Inventor: Hiroaki Kayama, Kariya (JP)

(73) Assignee: DENSO CORPORATION, Kariya (JP)

(*) Notice: Subject to any disclaimer, the term of this patent is extended or adjusted under 35 U.S.C. 154(b) by 0 days.

(21) Appl. No.: 16/446,978

(22) Filed: Jun. 20, 2019

(65) Prior Publication Data

US 2020/0003094 A1 Jan. 2, 2020

(30) Foreign Application Priority Data

Jun. 27, 2018 (JP) .................................. 2018-122412
Dec. 13, 2018 (JP) .................................. 2018-233554

(51) Int. Cl.
*F01N 3/022* (2006.01)
*B01D 46/24* (2006.01)

(52) U.S. Cl.
CPC ............ *F01N 3/022* (2013.01); *B01D 46/244* (2013.01); *F01N 2330/30* (2013.01); *F01N 2550/04* (2013.01)

(58) Field of Classification Search
CPC .... F01N 3/022; F01N 3/0222; F01N 2330/30; F01N 2550/04; B01D 46/244
USPC ............................. 422/168, 177, 180; 55/523
See application file for complete search history.

(56) References Cited

U.S. PATENT DOCUMENTS

| 5,545,243 | A | 8/1996 | Kotani et al. |
| 2002/0004445 | A1 | 1/2002 | Beall et al. |
| 2003/0224933 | A1* | 12/2003 | Kondo ................. B01D 53/885 502/439 |
| 2004/0115392 | A1* | 6/2004 | Miyakawa ............ C04B 18/165 428/116 |
| 2004/0161596 | A1* | 8/2004 | Taoka ................ B01D 46/2429 428/304.4 |
| 2007/0048494 | A1 | 3/2007 | Miyairi et al. |
| 2007/0196620 | A1 | 8/2007 | Ohno et al. |
| 2007/0225149 | A1 | 9/2007 | Hayashi et al. |
| 2008/0092499 | A1 | 4/2008 | Otsuka et al. |
| 2008/0125316 | A1 | 5/2008 | Noda et al. |

(Continued)

FOREIGN PATENT DOCUMENTS

| EP | 0 753 490 | 1/1997 |
| EP | 2 107 046 | 10/2009 |

(Continued)

*Primary Examiner* — Tom P Duong
(74) *Attorney, Agent, or Firm* — Nixon & Vanderhye P.C.

(57) ABSTRACT

A honeycomb structure body has an outer skin, cells arranged in an inside of the outer skin, and partition walls having pores. The partition walls are arranged in the inside of the outer skin. Each of the cells is surrounded by the partition walls. The pores have communicating pores which communicate with each other adjacent cells. Exhaust gas emitted from an engine passes adjacent cells through the communicating pores. The number of the communicating pores is at a density of not less than 18000 [pores/0.25 mm$^2$] before a catalyst is supported in the pores. An exhaust gas purification filter having the honeycomb structure body with the catalyst is arranged in an exhaust gas pipe to purify exhaust gas containing PM emitted from an engine.

16 Claims, 17 Drawing Sheets

(56) References Cited

U.S. PATENT DOCUMENTS

| | | | |
|---|---|---|---|
| 2008/0220205 A1 | 9/2008 | Miwa et al. | |
| 2009/0087365 A1* | 4/2009 | Klingmann | B01D 53/944 423/213.5 |
| 2012/0009092 A1* | 1/2012 | Mizutani | B01J 23/002 422/177 |
| 2012/0270010 A1* | 10/2012 | Hiratsuka | B01D 46/247 428/118 |
| 2012/0317947 A1 | 12/2012 | Okazaki | |
| 2013/0145735 A1 | 6/2013 | Motoki et al. | |
| 2013/0316130 A1* | 11/2013 | Takahashi | C04B 38/0009 428/116 |
| 2014/0103560 A1 | 4/2014 | Okazaki | |
| 2015/0005153 A1* | 1/2015 | Hayashi | B01J 32/00 502/87 |
| 2017/0246622 A1 | 8/2017 | Nobiki | |
| 2017/0274323 A1* | 9/2017 | Yamamoto | B01D 46/2429 |
| 2017/0274354 A1* | 9/2017 | Yamamoto | B28B 11/041 |

FOREIGN PATENT DOCUMENTS

| | | |
|---|---|---|
| EP | 2 610 448 | 7/2013 |
| JP | 2008-37722 | 2/2008 |
| JP | 2010-138770 | 6/2010 |
| JP | 2014-184422 | 10/2014 |
| JP | 2017-141778 | 8/2017 |
| JP | 2017-163691 | 9/2017 |
| JP | 2017-164691 | 9/2017 |
| JP | 2019-2298 | 1/2019 |

* cited by examiner 12
121

12
121

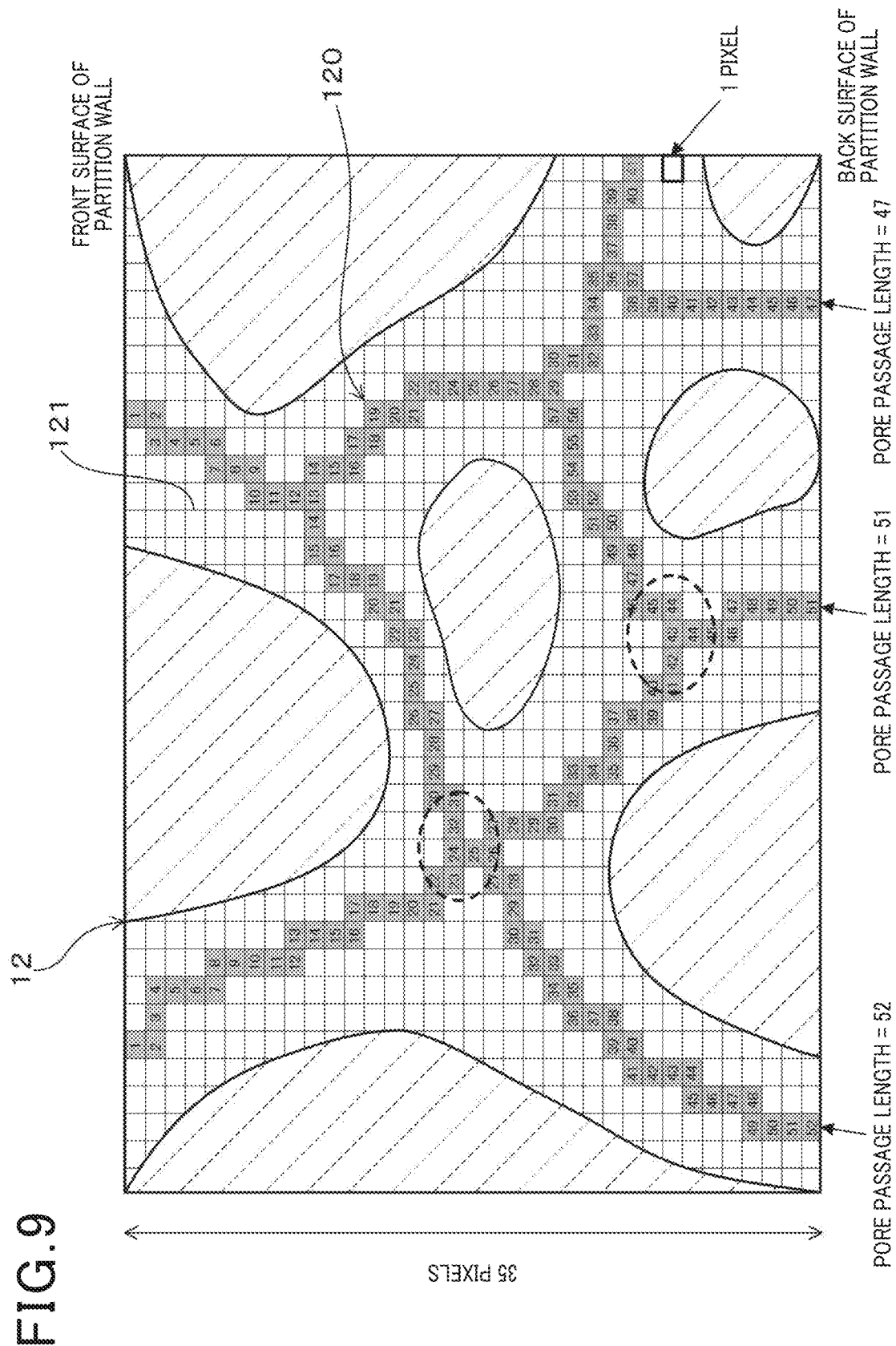

HONEYCOMB STRUCTURE BODY AND EXHAUST GAS PURIFICATION FILTER

CROSS-REFERENCE TO RELATED APPLICATION

This application is related to and claims priority from Japanese Patent Applications No. 2018-122412 filed on Jun. 27, 2018 and No. 2018-233554 filed on Dec. 13, 2018, the contents of which are hereby incorporated by reference.

TECHNICAL FIELD

The present disclosure relates to honeycomb structure bodies and exhaust gas purification filters equipped with a honeycomb structure body and catalyst.

BACKGROUND

Exhaust gas, emitted from internal combustion engines such as diesel engines and petroleum engines, and heat engines such as boilers, contains particulate matter (hereinafter, PM) as harmful fine substances. An exhaust gas purification filter equipped with a honeycomb structure body and catalyst is widely used for collecting PM from exhaust gas so as to purify the exhaust gas.

In general, an exhaust gas purification filter is composed of a honeycomb structure body and catalyst. The honeycomb structure body has a plurality of cells. On a cross section of the honeycomb structure body, which is perpendicular to a longitudinal direction of the honeycomb structure body, a plurality of cells are partitioned by partition walls. Each of the partition walls has a porous structure in which a plurality of pores are formed. Catalyst is supported in the pores formed in the partition walls. There is a strong demand for the exhaust gas purification filter to have a high particulate matter collection rate (PM collection rate) of collecting PM from exhaust gas, and to have a low pressure loss.

SUMMARY

It is desired for the present disclosure to provide a honeycomb structure body and an exhaust gas purification filter. In a structure of the honeycomb structure body, exhaust gas passes through communicating pores formed in partition walls between cells adjacently arranged. The communicating pores formed in the partition walls have a density at not less than 18000 [pores/0.25 mm$^2$]. The present disclosure further provides an exhaust gas purification filter equipped with the honeycomb structure body and catalyst supported on pore walls of the communicating pores. The present disclosure further provides an exhaust gas purification filter having the honeycomb structure body and catalyst. In the exhaust gas purification filter, pore walls support the catalyst at not less than 30 g/liter. After catalyst support, communicating pores which are not clogged with the catalyst have a density at not less than 4500 [pores/0.25 mm$^2$].

BRIEF DESCRIPTION OF THE DRAWINGS

A preferred, non-limiting embodiment of the present disclosure will be described by way of example with reference to the accompanying drawings, in which:

FIG. 9 is a schematic view showing a thinned line image as a line network structure of pore passages in the partition wall in the honeycomb structure body according to the first exemplary embodiment;

DETAILED DESCRIPTION OF THE PREFERRED EMBODIMENTS

Figure 1:
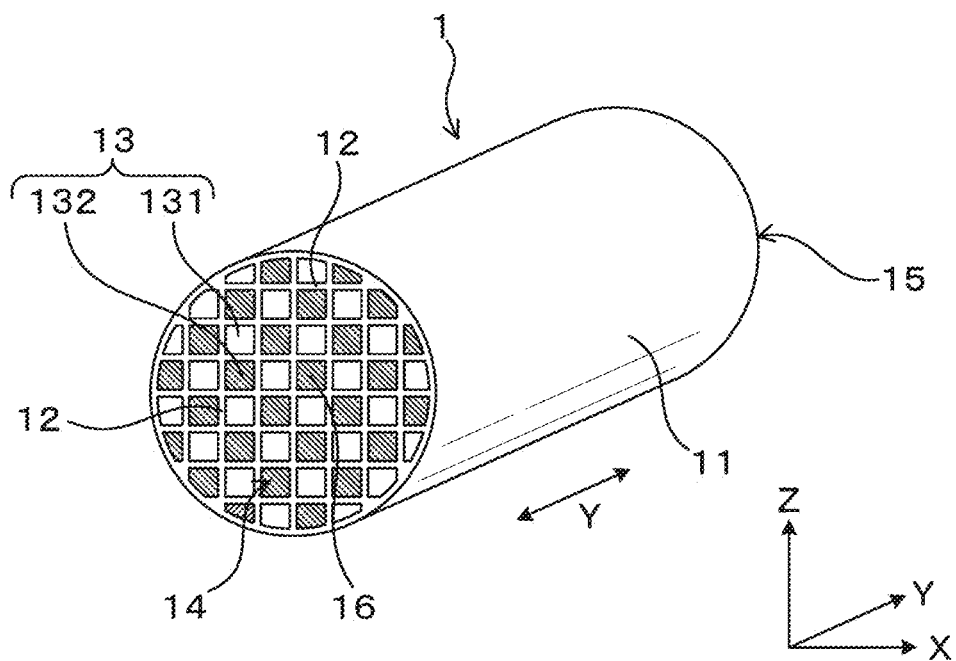
FIG. 1 is a perspective view showing a honeycomb structure body according to a first exemplary embodiment of the present disclosure.

Hereinafter, various embodiments of the present disclosure will be described with reference to the accompanying drawings. In the following description of the various embodiments, like reference characters or numerals designate like or equivalent component parts throughout the several diagrams.

First Exemplary Embodiment

A description will be given of a honeycomb structure body according to a first exemplary embodiment of the present disclosure with reference to FIG. 1 to FIG. 13.

FIG. 1 is a perspective view showing the honeycomb structure body 1 according to the first exemplary embodiment. A honeycomb structure body 1 is applied as a base member to an exhaust gas purification filter 3. The exhaust gas purification filter is composed of the honeycomb structure body 1 according to the first exemplary embodiment with catalyst.

For example, the honeycomb structure body 1 is made of cordierite. The honeycomb structure body 1 has an outer skin 11, the partition walls 12 and the cells 13. For example, the outer skin 11 has a cylindrical shape. The following various exemplary embodiments and experiments will use an axial direction Y of the outer skin 11 as an axial direction Y of the honeycomb structure body 1.

Figure 2:
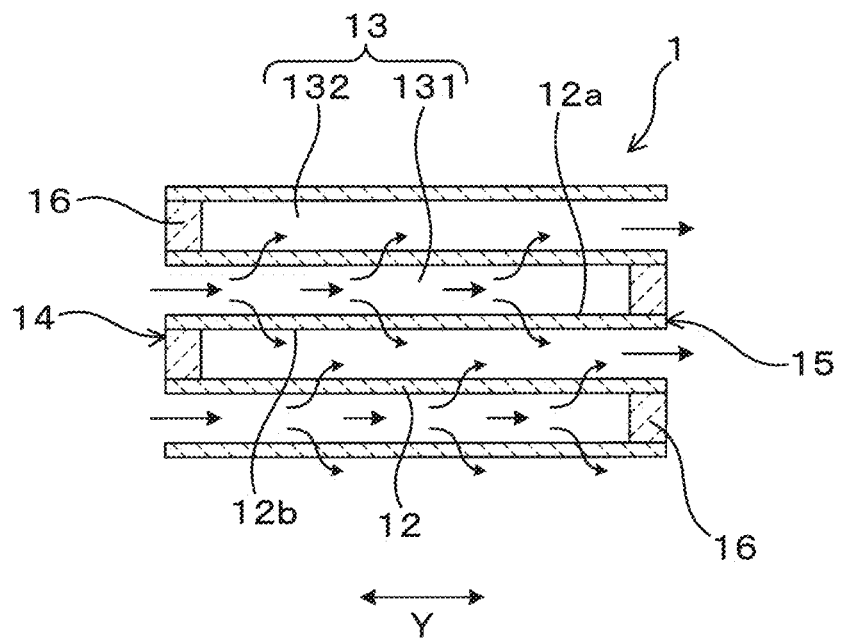
FIG. 2 is a partially enlarged view showing a cross section in an axial direction of the honeycomb structure body according to the first exemplary embodiment of the present disclosure shown in FIG. 1.

FIG. 2 is a partially enlarged view showing a cross section in the axial direction Y of the honeycomb structure body 1 according to the first exemplary embodiment shown in FIG. 1. Arrows shown in FIG. 2 represent via flow of exhaust gas emitted from an internal combustion engine (not shown) when the honeycomb structure body 1 is arranged in an exhaust gas passage such as an exhaust gas pipe joined to the internal combustion engine. In a concreate example, a converter having an exhaust gas purification filter 3 equipped with the honeycomb structure body 1 is arranged in an exhaust gas pipe as the gas flow passage joined to the internal combustion engine. The honeycomb structure body 1 will be explained later.

As shown in FIG. 1 and FIG. 2, an inner area of the outer skin 11 is partitioned by the partition walls 12. The partition walls 12 are also referred to as cell walls. The partition walls 12 are arranged in a lattice arrangement on a cross section of the honeycomb structure body 1, which is perpendicular to the axial direction of the honeycomb structure body 1. The honeycomb structure body 1 has a porous structure.

Figure 3A:
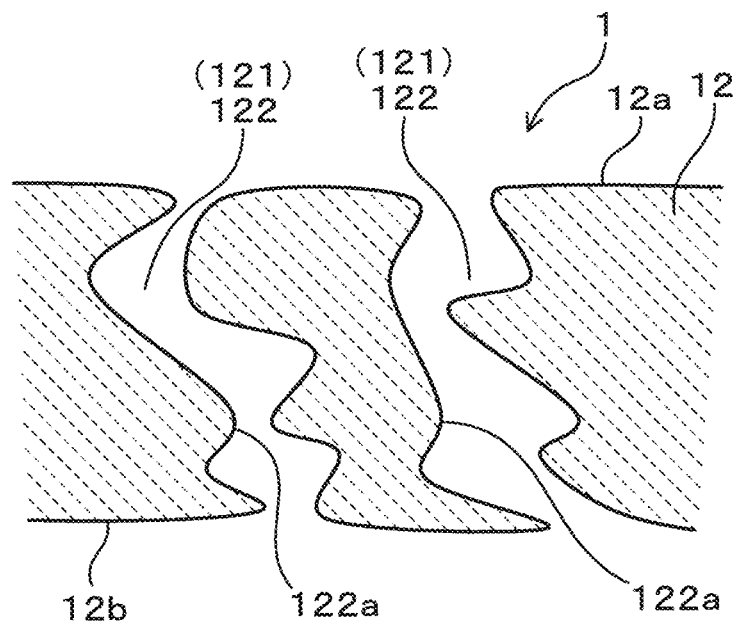
FIG. 3A is an enlarged cross sectional view showing a schematic structure of pores formed in a partition wall of a cell in the honeycomb structure body according to the first exemplary embodiment.
Figure 3B:
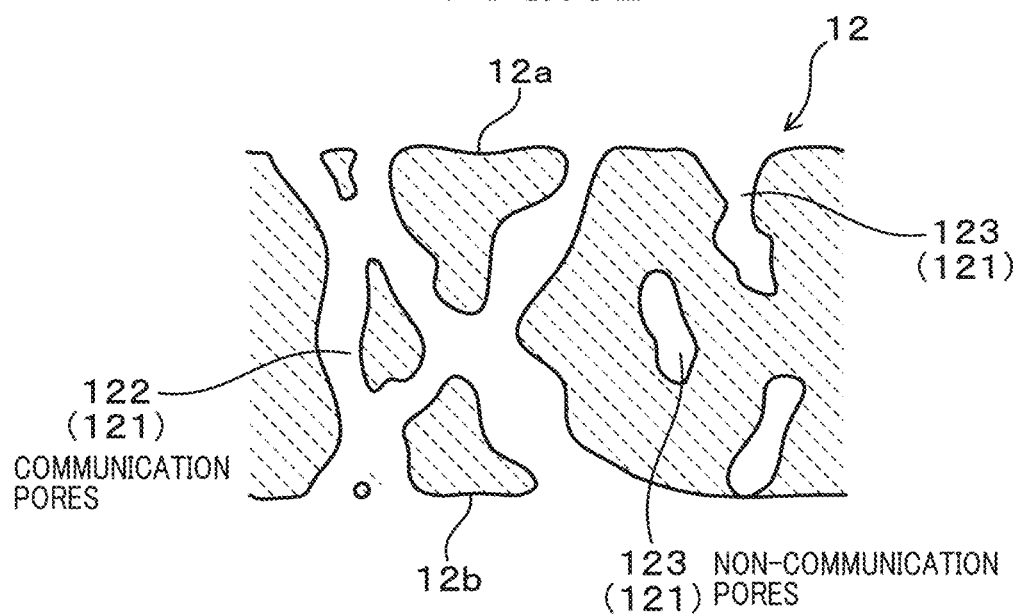
FIG. 3B is an enlarged cross sectional view showing another schematic structure of the pores formed in the partition wall of the cell in the honeycomb structure body according to the first exemplary embodiment.

As shown in FIG. 3A and FIG. 3B, a plurality of the pores 121 are formed in the partition wall 12. When exhaust gas passes through the pores 121 and flows on the surface of the partition walls 12, particulate matter (PM) contained in exhaust gas is trapped and collected by the pores 121 and the partition walls 12. That is, the honeycomb structure body 1 collects PM as fine harmful particles from the exhaust gas, and the exhaust gas is thereby purified.

It is preferable for the partition walls 12 to have an average pore diameter to be within a range of not less than 12 μm and not more than 30 μm, and preferably to have the average pore diameter to be within a range of not less than 13 μm and not more than 28 μm, and more preferably to have the average pore diameter to be within a range of not less than 15 μm and not more than 25 μm.

It is preferable for the partition walls 12 to have a porosity to be within a range of not less than 55% and not more than 75%, and preferably to have the porosity to be within a range of not less than 58% and not more than 73%, and more preferably to have the porosity to be within a range of not less than 60% and not more than 70%.

When the partition walls 12 has the average pore diameter to be within the range of not less than 12 μm and not more than 30 μm, and the porosity to be within the range of not less than 55% and not more than 75%, this structure allows catalyst to be adequately supported by the pores 121 formed in the partition walls 12. That is, this structure makes it possible for the pores 121 in the partition walls 12 to reliably support catalyst therein.

Further, when the partition walls 12 have the porosity to be within the range of not more than 75%, it is possible for the honeycomb structure body 1 to have structural reliability. It is possible to detect the average pore diameter and, the porosity of the partition walls 12 by a mercury press-in method which will be explained in the description regarding experiments later.

As shown in FIG. 1 and FIG. 2, the honeycomb structure body 1 has a plurality of the cells 13. Each of the cells 13 is surrounded by the partition walls 12 so as to form exhaust gas an exhaust gas channel through which exhaust gas flows. In general, a longitudinal direction of the cells 13 corresponds to the axial direction Y of the honeycomb structure body 1.

As shown in FIG. 1, on a cross section of the honeycomb structure body 1 in a direction which is perpendicular to the axial direction Y, each of the cells 12 has a square shape. The concept of the present disclosure is not limited by this shape. For example, it is possible for the honeycomb structure body 1 to have the cells 12 having a polygonal shape such as a triangle shape, a square shape, hexagonal shape, etc. Further, it is acceptable for the honeycomb structure body 1 to have the cells 12 having different shapes of not less than two types, The honeycomb structure body 1 has a cylindrical shape, for example. It is acceptable for the honeycomb structure body 1 to have a total length according to requirements. The honeycomb structure body 1 has a first end surface 14 and a second end surface 15 at both ends thereof, viewed in the axial direction Y.

When the exhaust gas purification filter 3 equipped with the honeycomb structure body 1 is arranged in an exhaust gas passage such as an exhaust gas pipe (not shown) joined to an internal combustion engine (not shown), the first end surface 14 is arranged at an upstream side of the flow of exhaust gas and the second end surface 15 is arranged at a downstream side of the flow of the exhaust gas.

It is possible for the honeycomb structure body 1 to have the cells 13 composed of first cells 131 and second cells 132. Each of the first cells 131 is open on the first end surface 14, and is closed by a plug member 16 on the second end surface 15. On the other hand, each of the second cells 132 is closed by a plug member 16 on the first end surface 14, and is open on the second end surface 15. The plug member 16 is a sealing part made of ceramics such as cordierite, for example. It is possible to use another material as the plug members 16.

The first cells 131 and the second cells 132 are formed, i.e. arranged alternately and adjacently with each other in a lateral direction which is perpendicular to the axial direction Y, and in a vertical direction which is perpendicular to the axial direction Y and the lateral direction. That is, when the first end surface 14 or the second end surface 15 is viewed from the axial direction Y, the first cells 131 and the second cells 132 are arranged in a lattice shaped pattern or a checkers pattern.

As shown in FIG. 2, the first cell 131 is separated from the second cell 132 adjacent to the first cell 131 by the partition walls 12

FIG. 3A is an enlarged cross sectional view showing a schematic structure of pores 121 formed in a partition wall of the cell 13 in the honeycomb structure body 1 according to the first exemplary embodiment. FIG. 3B is an enlarged cross sectional view showing another schematic structure of the pores 121 formed in the partition wall 12 of the cell 13 in the honeycomb structure body 1 according to the first exemplary embodiment.

As shown in FIG. 3A and FIG. 3B, a plurality of pores 121 are formed in the partition walls 12. In the honeycomb structure body 1, it is acceptable for the pores 121 to have non-communicating pores, i.e. closed pores 123 in addition to the communicating pores 122. The first cell 131 communicates with the second cell 132 through the communicating pores 122. On the other hand, the closed pores 123 does not communicate between the first cell 131 and the second cell 132.

Figure 4A:
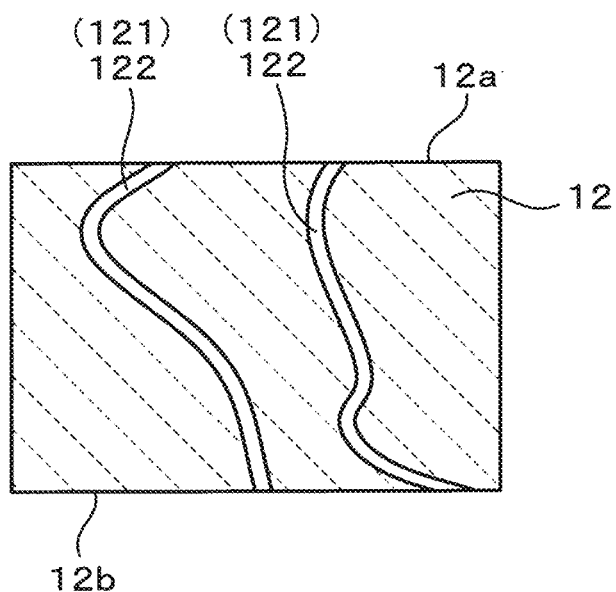
FIG. 4A is a cross sectional view showing a simplified structure of the pores formed in the partition wall shown in FIG. 3A.
Figure 4B:
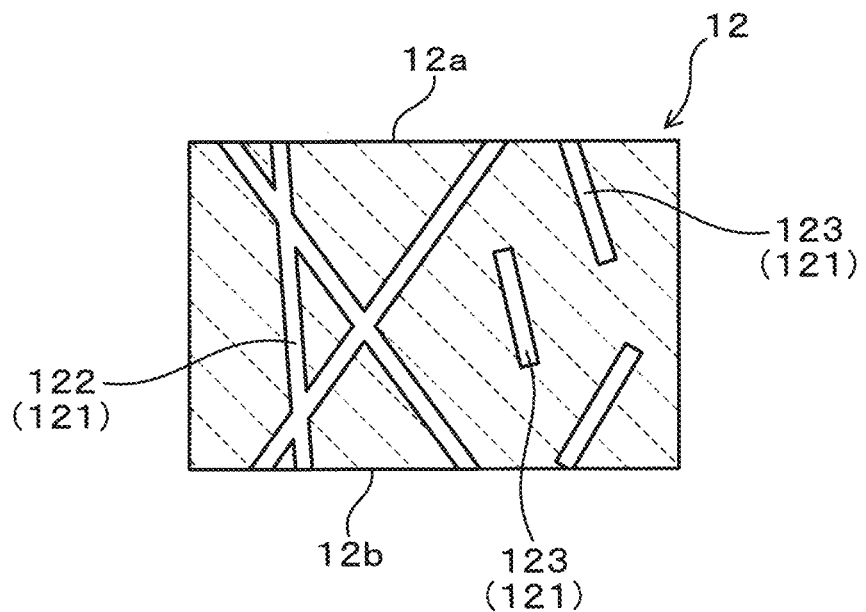
FIG. 4B is a cross sectional view showing a simplified structure of the pores formed in the partition wall shown in FIG. 3B.

FIG. 4A is a cross sectional view showing a simplified structure of the pores 121 formed in the partition wall 12 shown in FIG. 3A. FIG. 4B is a cross sectional view showing a simplified structure of the pores 121 formed in the partition wall 12 shown in FIG. 3B.

Each of FIG. 3A, FIG. 3B, FIG. 4A and FIG. 4B shows a binary image of the pores 121. In particular, most communicating pores 122 are joined together three dimensionally, i.e. in a three-dimensional manner (i.e. in 3D regions).

In the structure of the honeycomb structure body 1 according to the first exemplary embodiment, the total number of the communicating pores 122, through which the adjacent cells 13 are communicated with each other, is not less than 18000 [pores/0.25 $mm^2$] before the catalyst support.

A density of the communicating pores 122 corresponds to the number of the communicating pores 122 in a unit area before the catalyst support. When the communicating pores 122 before the catalyst support have a density at less than 18000 [pores/0.25 $mm^2$], the PM collection rate and the pressure loss of the honeycomb structure body 1 after the addition of catalyst into the partition walls 12 are deteriorated. The reason why is that an amount of catalyst per communicating pore to be fed into the inside of the communicating pores 122 is increased, and many of the communicating pores 122 are clogged with the fed catalyst.

On the other hand, when the density of the communicating pores 122 before the catalyst support is less than 18000 [pores/0.25 $mm^2$], the deterioration rate of each of the PM collection rate and the pressure loss becomes high.

The reason why is as follows. When the communicating pores 122 are clogged with catalyst in the area in which the density of the communicating pores is less than 18000 [pores/0.25 $mm^2$] before the catalyst support, this introduces difficulty for exhaust gas to flow in the partition walls 12. In the latter case, the deterioration of the PM collection rate and the pressure loss occurs due to the structure of the honeycomb structure body 1, and the effect in presence of the communicating pores 122 in the partition walls 12 is reduced.

From the viewpoint of improving the PM collection rate and the pressure loss, it is preferable for the partition walls 12 in the honeycomb structure body 1 to have the communicating pores 122 at a density of not less than 19000 [pores/0.25 $mm^2$], and more preferably to have the communicating pores 122 at a density of not less than 20000 [pores/0.25 $mm^2$], and further preferably to have the communicating pores 122 at a density of not less than 20600 [pores/0.25 $mm^2$].

Further, it is more preferably for the partition walls 12 to have the communicating pores 122 at a density of not less than 21000 [pores/0.25 $mm^2$], and still more preferably to have the communicating pores 122 at a density of not less than 21500 [pores/0.25 $mm^2$].

Further, it is further preferable for the partition walls 12 to have the communicating pores 122 at a density of not less than 22000 [pores/0.25 $mm^2$], and particular preferable to have the communicating pores 122 at a density of not less than 22600 [pores/0.25 $mm^2$].

It is most preferably for the partition walls 12 to have the communicating pores 122 at a density of not less than 23000 [pores/0.25 $mm^2$].

From the viewpoint of strength of the exhaust gas purification filter 3 equipped with the honeycomb structure body 1, it is possible for the partition walls 12 in the honeycomb structure body 1 to have the communicating pores 122 at a density of not less than 30000 [pores/0.25 $mm^2$].

In the detection of the number of the communicating pores 122, it is necessary to calculate the pore passage length of each of the communicating pores 122 in each pore 121. When the pores intersect with each other in the partition wall, it is important to select a short pore passage so as to reduce a pressure loss, and calculate a frequency distribution of pore passage lengths. For example, it is difficult for a mercury porosimeter to measure the pore passage length and a pore passage when pores intersect with each other. Accordingly, it is difficult to correctly calculate and analyze the frequency distribution of the pore passage lengths and difficult to select a shorter passage length of the communicating pores when the pores 121 intersect with each other on the basis of detection results of the mercury porosimeter.

In order to solve the problem previously described, the first exemplary embodiment performs a line thinning process of each pore 121 formed in the partition walls 12 on the basis of image data which have been processed by three-dimensional analysis using a computed tomography (CT) scan. Further, the image processing software selects the pores 121 which intersect with each other in the partition walls 12, having a shorter pore passage length, and calculates the pore passage length.

A description will now be given of the method of detecting the number of the communicating pores 122.

Figure 5:
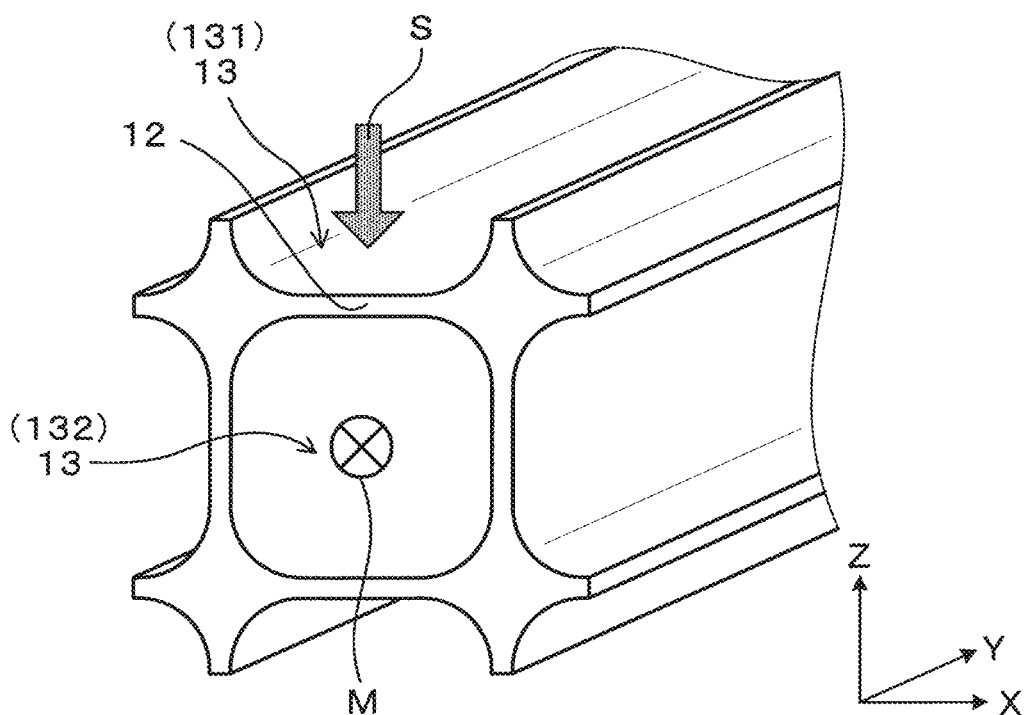
FIG. 5 is a schematic cross sectional view of a cell surrounded by partition walls in the honeycomb structure body according to the first exemplary embodiment.

FIG. 5 is a schematic cross sectional view of a cell surrounded by partition walls in the honeycomb structure body according to the first exemplary embodiment. As shown in FIG. 5, a partition wall 12 in a measurement sample obtained from the honeycomb structure body 1 is scanned by an Xradia520 Versa (manufactured by ZEISS GmbH) so as to obtain a CT scan image of the partition wall 12. The detection conditions, a tube voltage of 80 kV and a tube current of 87 mA. The resolution of the CT scan image is 1.6 μm/pixel). FIG. 5 shows a part of the measurement sample.

The scanning direction S of the computed tomography scan (CT scan) corresponds to a thickness direction of the partition wall 12. That is, the scan direction S represents a direction from a surface 12a of the partition wall 12 (the front surface 12a of the partition wall 12) at the first cell 131 side which is open at the first end surface 14 as the upstream side end surface of the flow of exhaust gas to a surface 12b of the partition wall 12 (the back surface 12b of the partition wall 12) at the second cell 132 side which is open at the second end surface 15 as the downstream side end surface of the flow of exhaust gas.

Figure 6:
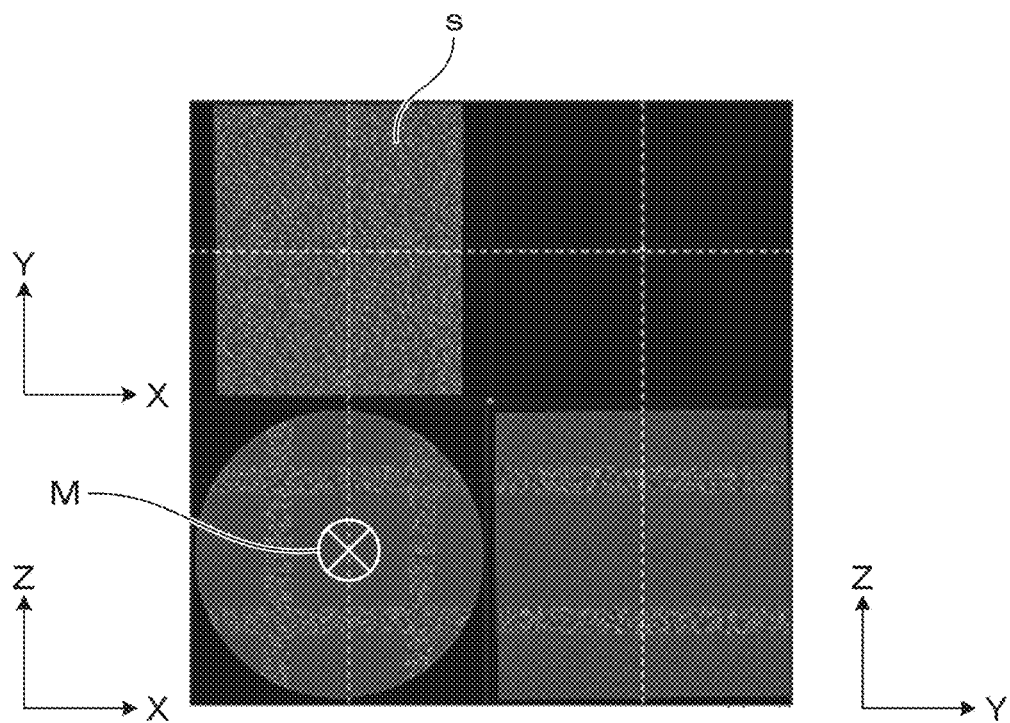
FIG. 6 is a view showing an example of a computed tomography (CT) scan image explaining the partition walls of the cell shown in FIG. 5 in the honeycomb structure body according to the first exemplary embodiment.
Figure 7:
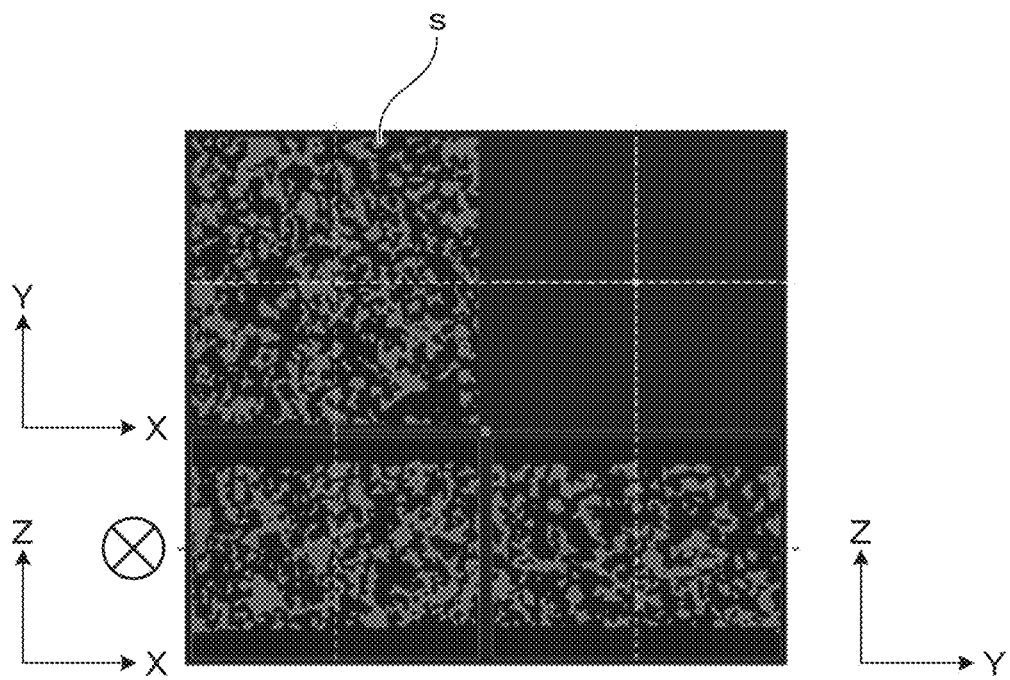
FIG. 7 is an enlarged view of the CT scan image shown in FIG. 6.

FIG. 6 is a view showing an example of a computed tomography scan (CT scan) image explaining the partition walls 12 of the cell 13 shown in FIG. 5 in the honeycomb structure body 1 according to the first exemplary embodiment. FIG. 7 is an enlarged view of the CT scan image shown in FIG. 6.

As shown in FIG. 6 and FIG. 7, the reference character Y indicates the axial direction of the honeycomb structure body 1, the reference character X represents the X direction, which is perpendicular to the axial direction Y, along one of the four partition walls 12 forming the second cell 132. The reference character Z indicates the Z direction which is perpendicular to the X direction and the Y direction. The reference character M represents the plug member 16 of the second cell 132 formed on the first end surface 14.

The scan direction S shown in FIG. 6 and FIG. 7 is the negative Z direction. FIG. 6 and FIG. 7 show the CT scan image s as examples in the negative Z direction. The CT scan images are obtained along the X-Y plane. The CT scan image in the Y direction (along the X-Z plane) is shown at the lower left in FIG. 6 and FIG. 7. The CT scan image in the negative X direction (along the Y-Z plane) is shown at the lower right in FIG. 6 and FIG. 7.

The analysis of a group of CT scan images is performed in the scan direction S. The number of the CT scan images in the group is equal to a value obtained by dividing a thickness of the partition wall 12 by 1.6 μm as a pixel size (Number of CT scan images=thickness of partition wall 12/pixel size of 1.6 μm).

Next, the binarization process of the CT scan images in the scan direction S is performed by using the ImageJ as a Java-based image processing program (which was developed at the National Institutes of Health and the Laboratory for Optical and Computational Instrumentation.)

The binarization process extracts pore parts from solid parts which have been extracted from the CT scan images of the partition walls 12. Because the pores and the solid parts have a different brightness from each other, the binarization process eliminates noises from the CT scan images, determines optional threshold values, and performs the binarization of the CT scan images based on the optional threshold values. Because CT scan images of various measurement samples have a different threshold value, the optimum threshold value is determined so as to correctly extract the pores and the solid parts from the CT scan images while visually detecting the overall CT scan images obtained by the CT scan process.

Figure 8A:
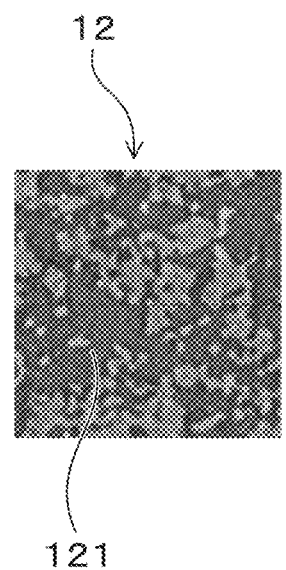
FIG. 8A is a view showing a CT scan image of a partition wall in the honeycomb structure body according to the first exemplary embodiment.
Figure 8B:
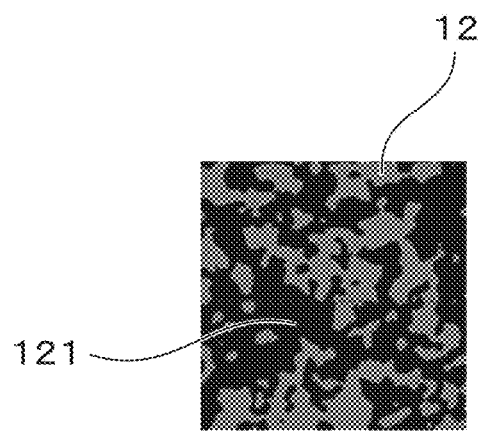
FIG. 8B is a view showing a binary image of the CT scan image shown in FIG. 8A.

FIG. 8A is a view showing the CT scan image of the partition walls in the honeycomb structure body 1 according to the first exemplary embodiment. FIG. 8B is a view showing the binary image of the CT scan image shown in FIG. 8A.

In FIG. 8B, a black color represents the pores 121, and a gray color represents the solid parts of the partition walls 12.

After the binarization process, a pore passage length of the pores 121 is measured in the binarized CT scan images by using the IGORL manufactured by HULINKS Inc. Next, the line thinning process of the pores 121 in the binarized CT scan images is performed.

FIG. 9 is a schematic view showing the thinned line image as a line network structure of the pore passages 121. As shown in FIG. 9, the line thinning process connects central points of pixels (designated by integers) of each pore 121. The thinned line passage 120 connects the central points of the pixels of each pore 121.

In the first cell 131 and the second cell 132, which are adjacently arranged and separated from each other by the partition wall 12 in the thinned line image shown in FIG. 9, the number of the pixels is calculated as the length of the pore passage. The calculated pixels are belong to a shorter passage measured from an inlet of the pore 121 which is open at the front surface 12a of the partition wall surface 12 side facing the first cell 131 to an outlet of the pore 121 which is open at the back surface 12b of the partition wall 12 side facing the second cell 132.

When the thinned lines intersect with each other, for example, like the areas surrounded by the solid dotted lines shown in FIG. 9, the thinned line of a shorter length is selected.

The length of each of the overall pore passages measured from the front surface 12a of the partition wall 12 to the back surface 12b of the partition wall 12 is calculated by a three dimensional (2D) analyzer.

In the binarized CT scan image shown in FIG. 9, it is necessary to calculate the length of each of the three pore passages. The length, i.e. the number of pixels forming each of the pore passages is 52, 51 and 47, respectively. It is possible to calculate the actual pore passage length as 1.6 times the number of pixels forming each pore passage because the CT scan image resolution is 1.6 μm/pixels. FIG. 9 shows an example of the thinned line image which is different from an actual thickness of the partition wall 12.

Figure 10:
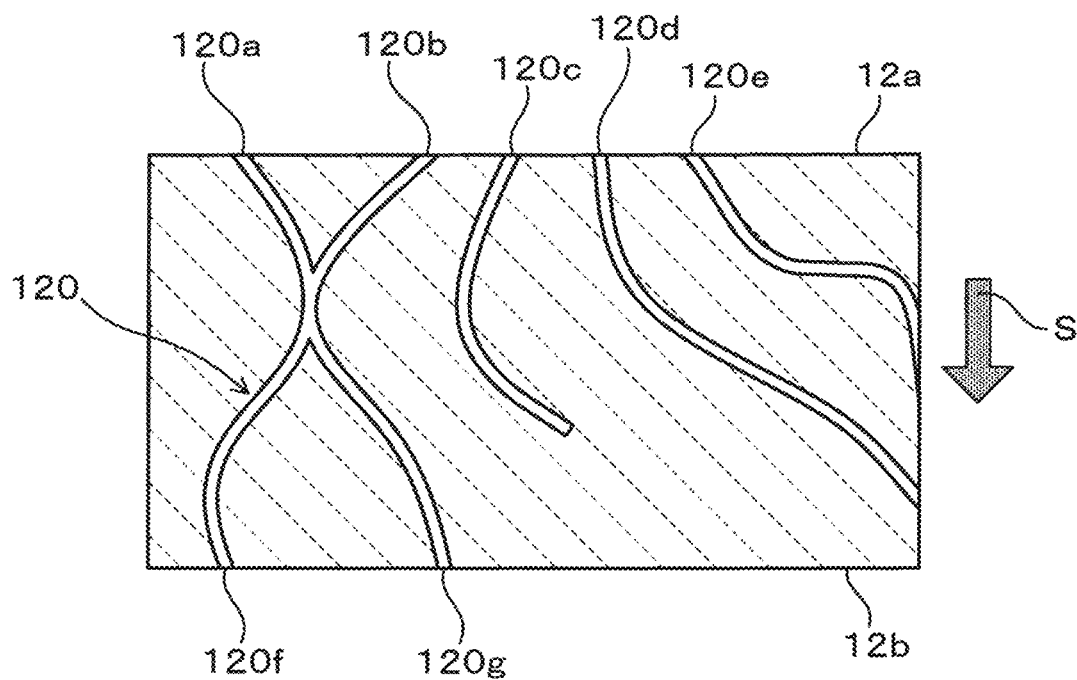
FIG. 10 is a schematic view showing another example of the thinned line image of the pore passages in the partition wall in the honeycomb structure body according to the first exemplary embodiment.
Figure 11:
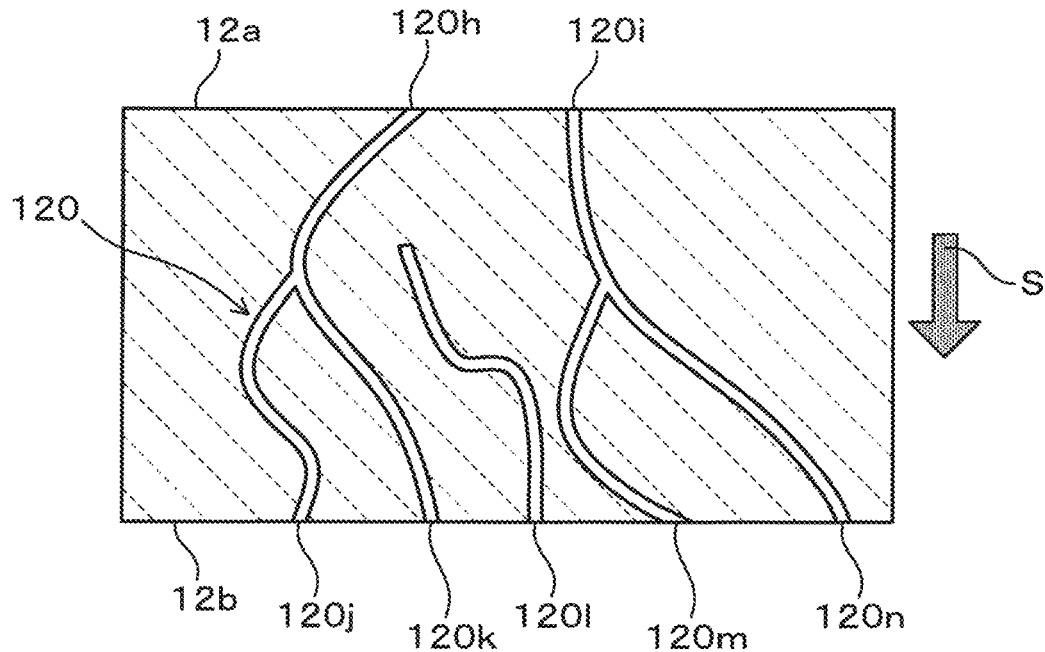
FIG. 11 is a schematic view showing another example of the thinned line image of the pore passages in the partition wall in the honeycomb structure body according to the first exemplary embodiment.

FIG. 10 is a schematic view showing another example of the thinned line image of the pore passages in the partition wall 12 in the honeycomb structure body according to the first exemplary embodiment. FIG. 11 is a schematic view showing another example of the thinned line image of the pore passages in the partition wall 12 in the honeycomb structure body according to the first exemplary embodiment.

FIG. 10 and FIG. 11 show the thinned line images which are simplified more than the binarized CT scan image shown in FIG. 9.

In the thinned line image shown in FIG. 10, the inlet 120*a* of the thinned line passage 120 has two outlets 120*f* and 120*g* thereof. The back surface 12*b* of the partition wall 12 has the outlet 120*f* and 120*g* only. That is, in the thinned line image shown in FIG. 10, the total number of the effective pore passages to be calculated is two.

Because the inlet 120*b* of the thinned line passage 120 shown in FIG. 10 has the two outlets 120*f* and 120*g* thereof, the number of the pore passage is not calculated. That is, this thinned line passage 120 is not added into the total number of effective pore passages.

Further, because the inlet 120*c* of the thinned line passage 120 shown in FIG. 10 has no outlet and belongs to the closed pores, this thinned line passage 120 is not also added into the total number of effective pore passages.

Still further, because each of the inlets 120*d* and 120*e* of the thinned line passage 120 shown in FIG. 10 has no outlet on the back surface 12*b* of the partition wall 12, this thinned line passage 120 is not also added into the total number of effective pore passages.

That is, these thinned line passages are disregarded when calculating the total number of effective pore passages.

In the thinned line image shown in FIG. 11, the back surface 12*b* of the partition wall 12 has the five outlets 120*i*, 120*k*, 120*i*, 120*m* and 120*n*. The inlet 120*h* of the thinned line passage 120 has the two outlets 120*j* and 120*k* thereof. The inlet 120*i* of the thinned line passage 120 has the two outlets 120*m* and 120*n* thereof.

The outlet 1201 belongs to a non-communicating passage which does not penetrate the partition wall 12, the number of the pore passage is not calculated. Accordingly, the total number of the pore passages to be calculated is four.

The calculation method previously described makes it possible to calculate the distribution of the pore passage lengths, i.e., to obtain a frequency histogram of the pore passage lengths on the basis of the calculated lengths of the pore passages in the partition walls 12. It is possible to obtain the distribution of the pore passage lengths on the basis of the histogram of the calculated pore passage lengths. The frequency histogram can be represented by using a bar graph composed of rectangular bars of length data (categorized data) per 10 μm. The heights or lengths of the rectangular bars are proportional to the respective calculated pore passage lengths. The sum of the frequency in the distribution of the pore passage lengths corresponds to the number of the communicating pores.

The reason why the rectangular bars of the length data (categorized data) are prepared per 10 μm is that it is preferable for each rectangle bar to correspond to an average pore diameter of approximately 10 μm as the minimum pore passage length. For example, the partition walls 12 in the honeycomb structure body 1 have the pores 121 having a different size within a range of 1 to 100 μm. Many pores have the pore diameter within a range of 10 to 20 μm because the pore diameter is determined due to the particle size of silica as the pore forming raw material. Accordingly, the use of the length data per 10 μm can calculate the pore passage length with high accuracy.

Figure 12:
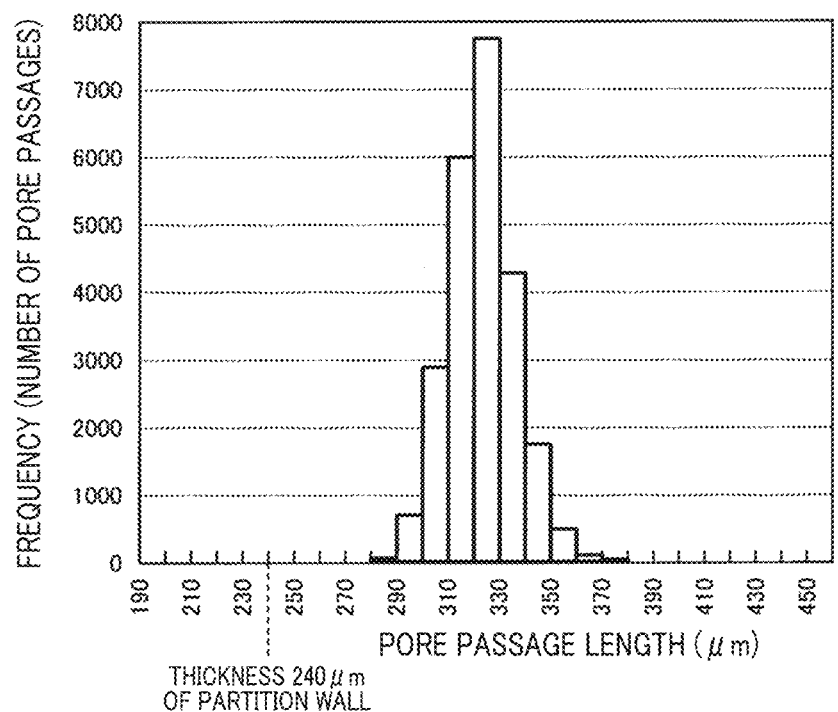
FIG. 12 is a view showing an example of a frequency histogram of a length of a pore passage in the honeycomb structure body according to the first exemplary embodiment.

FIG. 12 is a view showing an example of the frequency histogram of the pore passage lengths in the honeycomb structure body 1 according to the first exemplary embodiment. As shown in FIG. 12, when the thickness of the partition wall 12 is 240 μm, the minimum length of the pore passage length becomes 240 μm, and increased from 240 μm every 10 μm. Next, the total number of the pore passage lengths within a range of not less than 240 μm and less than 250 μm is counted. Similar to this, the total number of the pore passage lengths is continuously counted every 10 μm until 450 μm, as shown in FIG. 12.

Figure 13A:
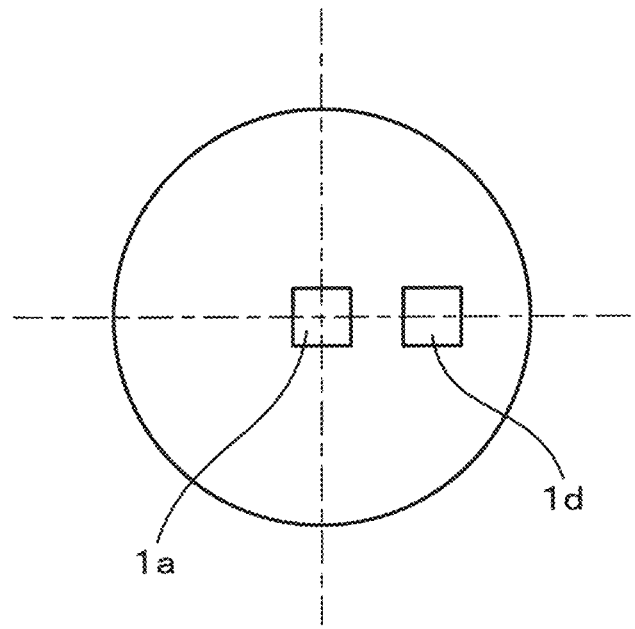
FIG. 13A and FIG. 13B are views showing six measurement parts in a honeycomb structure body to be used for calculating the total number of communicating pores.
Figure 13B:
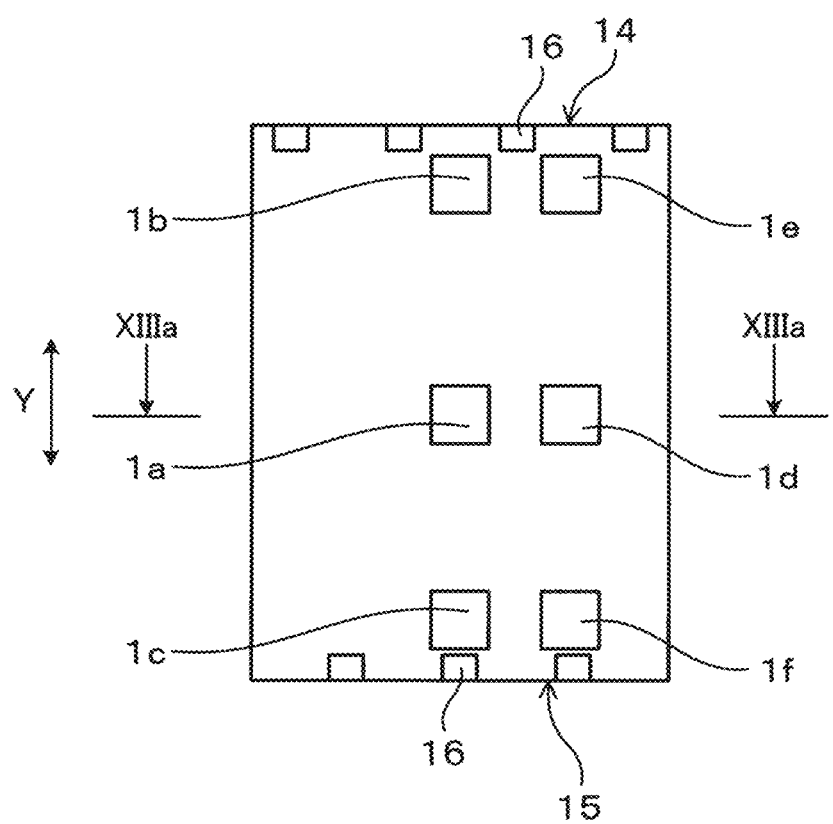

FIG. 13A and FIG. 13B are views showing six measurement parts in the honeycomb structure body 1 so as to calculate the number of the communicating pores. The total number of the communicating pores in the honeycomb structure body 1 is determined on the basis of an average number of the communicating pores detected in the six measurement parts selected from the honeycomb structure body 1.

As shown in FIG. 13A and FIG. 13B, the six measurement parts 1*a*, 1*b*, 1*c*, 1*d*, 1*e* and 1*f* are selected in the honeycomb structure body 1. The measurement part 1*a* is located at the central part in the axial direction Y passing through the central point in the diameter of the honeycomb structure body 1. The measurement part 1*b* is located at an inner part close to the plug member 16 on the first end surface 14 side (see the upper left side in FIG. 13B). The measurement part 1*c* is located at an inner part close to the plug member 16 on the second end surface 15 side (see the lower left side in FIG. 13B).

The measurement part 1*d* is located at the central part in the axial direction Y passing through the central point in the radius of the honeycomb structure body 1. The measurement part 1*e* is located at an inner part close to the plug member 16 on the first end surface 14 side (see the upper right side in FIG. 13B). The measurement part 1*f* is located at an inner part close to the plug member 16 on the second end surface 15 side (see the lower right side in FIG. 13B). Each of the six measurement parts 1*a* to 1*f* has a cube shape of 5 mm×5 mm×5 mm, in the axial direction, a vertical direction which is perpendicular to the axial direction Y, and a lateral direction which is perpendicular to the axial direction Y.

In the honeycomb structure body 1, it is possible to adjust the thickness of the partition walls 12 to be within a range of not less than 100 μm, and not more than 400 μm. As shown in FIG. 13A and FIG. 13B, the thickness of the partition walls 12 is an average value of detected values at the three measurement parts 1*a*, 1*b* and 1*c*. That is, the measurement part 1*a* is located at the central part in the axial direction Y passing through the central point in the diameter of the honeycomb structure body 1. The measurement part 1*b* is located at an inner part close to the plug member 16 on the first end surface 14 side (see the upper left side in FIG. 13B). The measurement part 1*c* is located at an inner part close to the plug member 16 on the second end surface 15 side (see the lower left side in FIG. 13B).

In particular, the honeycomb structure body 1 according to the first exemplary embodiment has the improved structure in which a density of the communicating pores, which corresponds to the number of the communicating pores, is not less than 18000 [pores/0.25 $mm^2$] as a specific value.

Accordingly, because the honeycomb structure body 1 has the communicating pores, a density of which is not less than 18000 [pores/0.25 $mm^2$] as the specific value, this structure makes it possible to effectively support catalyst, and to suppress deterioration of the PM collection rate and the pressure loss even 1*f* catalyst has been supported in the pores in the honeycomb structure body. The honeycomb structure body 1 in which the catalyst has been supported is used as an exhaust gas purification filter.

Because the partition walls formed in the honeycomb structure body 1 without any catalyst support can also collect PM contained in exhaust gas, it is also possible to use the honeycomb structure body 1 without catalyst as the exhaust gas purification filter. However, the collecting capability of the exhaust gas purification filter having the honeycomb structure body 1 and catalyst is higher than that of the honeycomb structure body 1 without catalyst support.

Next, a description will be given of the exhaust gas purification filter 3 with reference to FIG. 14.

Figure 14:
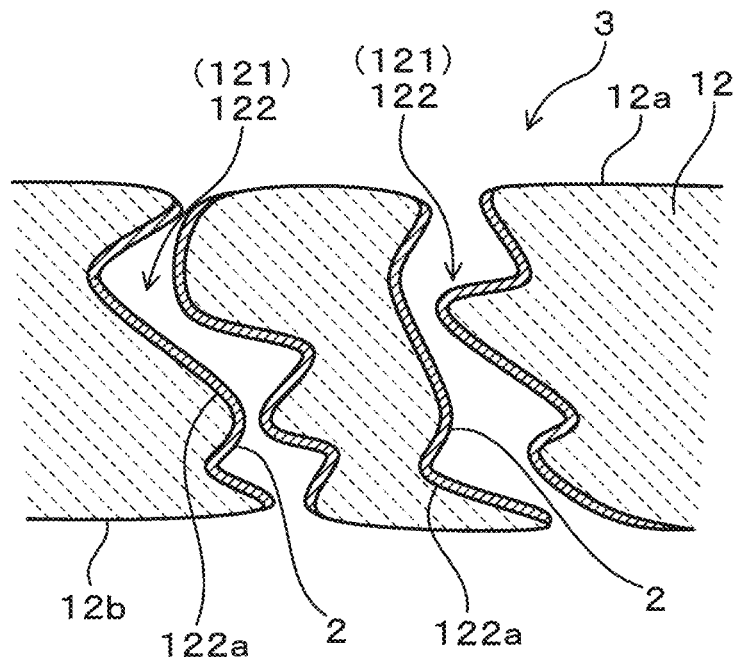
FIG. 14 is an enlarged cross sectional view showing a schematic structure of pores formed in a partition wall of a cell in the honeycomb structure body mounted on an exhaust gas purification filter according to the first exemplary embodiment.
Figure 15:
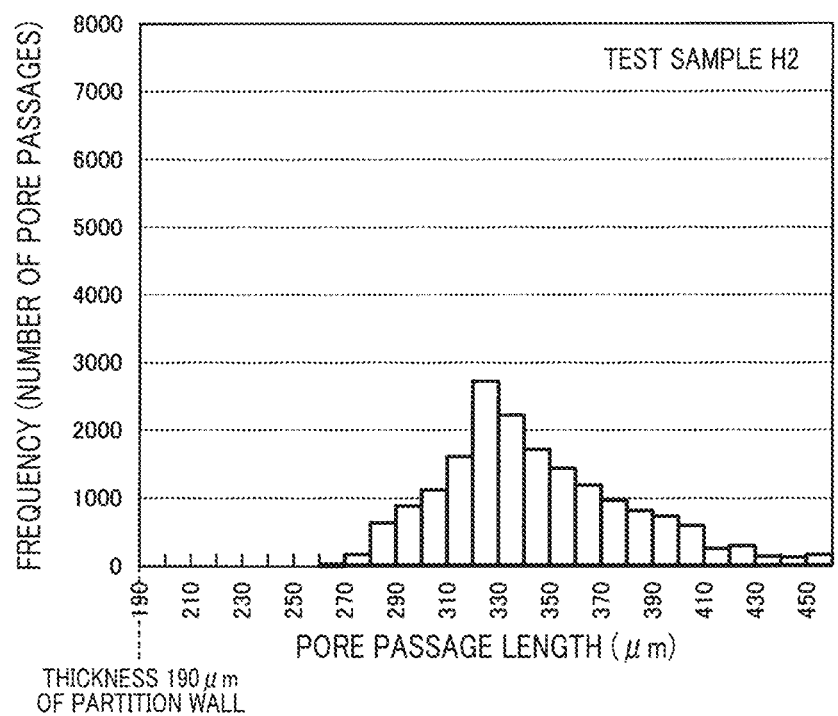
FIG. 15 is a view showing a frequency histogram of pore passage lengths in test sample H2 according to a second experiment.
Figure 16:
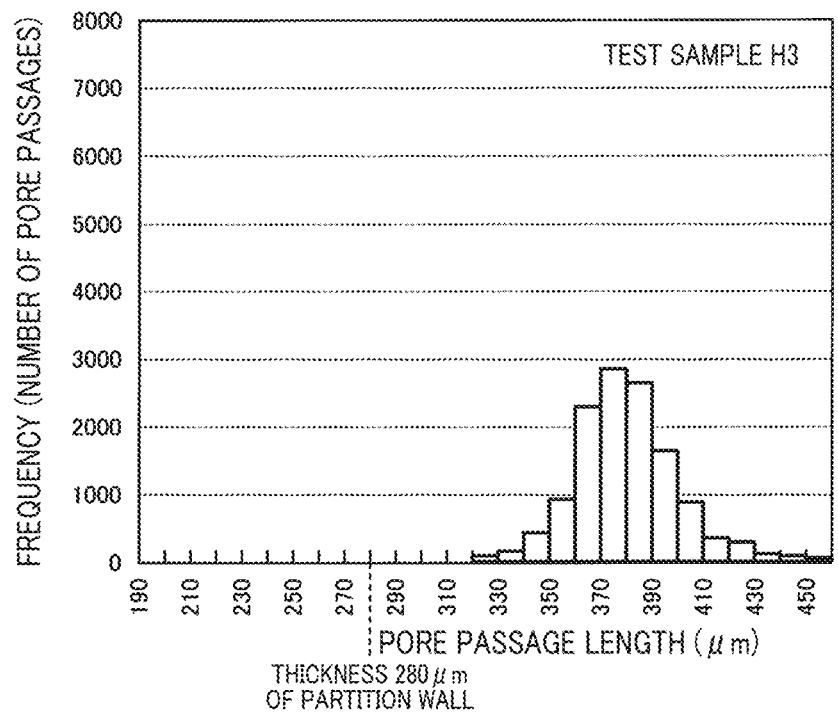
FIG. 16 is a view showing a frequency histogram of pore passage lengths in test sample H3 according to the second experiment.
Figure 17:
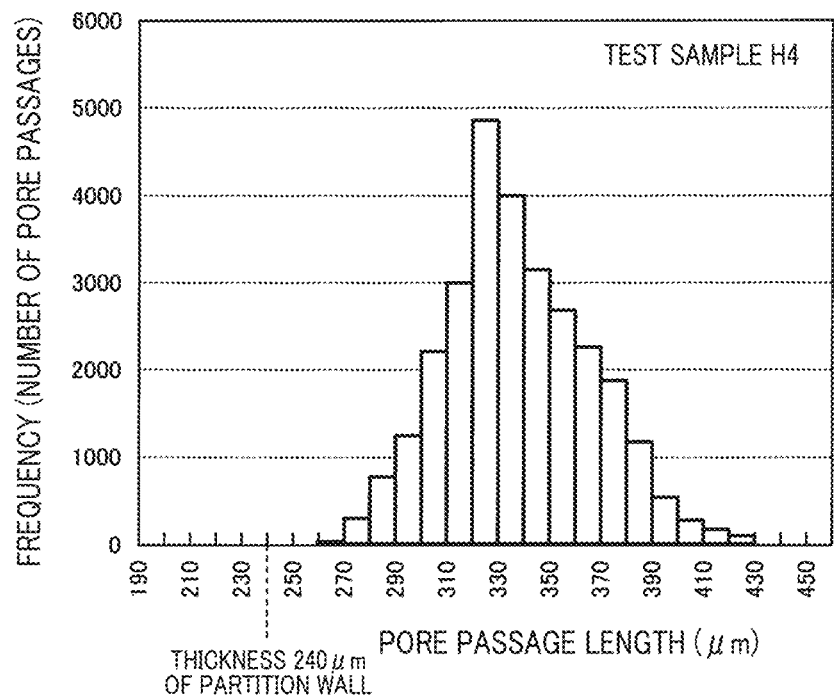
FIG. 17 is a view showing a frequency histogram of pore passage lengths in test sample H4 according to the second experiment.
Figure 18:
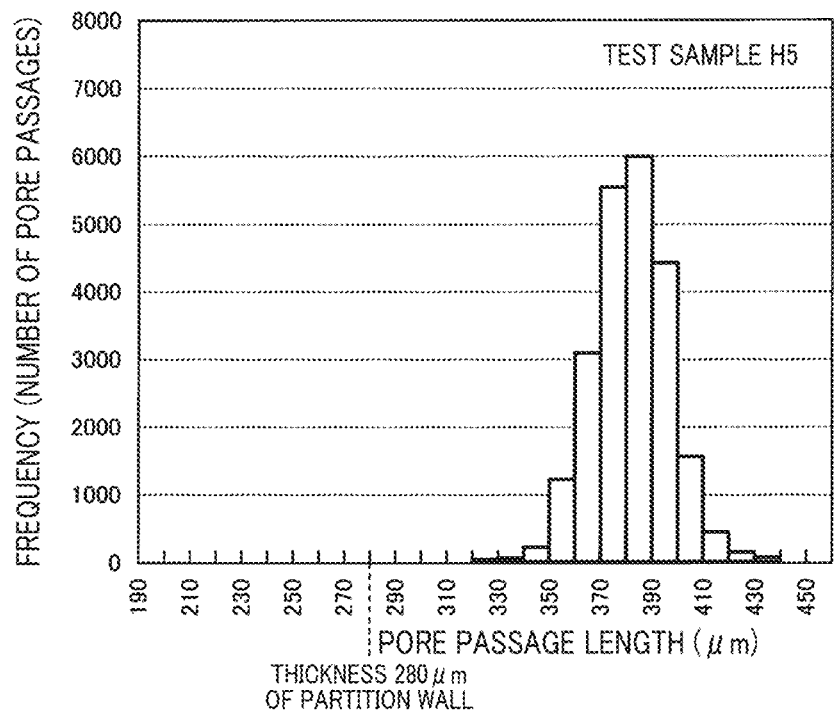
FIG. 18 is a view showing a frequency histogram of pore passage lengths in test sample H5 according to the second experiment.
Figure 19:
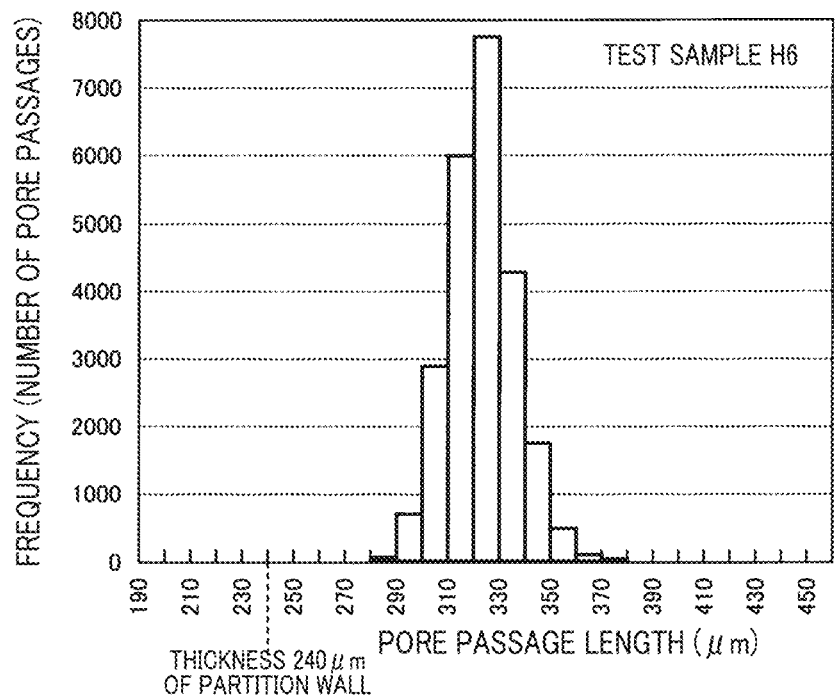
FIG. 19 is a view showing a frequency histogram of pore passage lengths in test sample H6 according to the second experiment.
Figure 20:
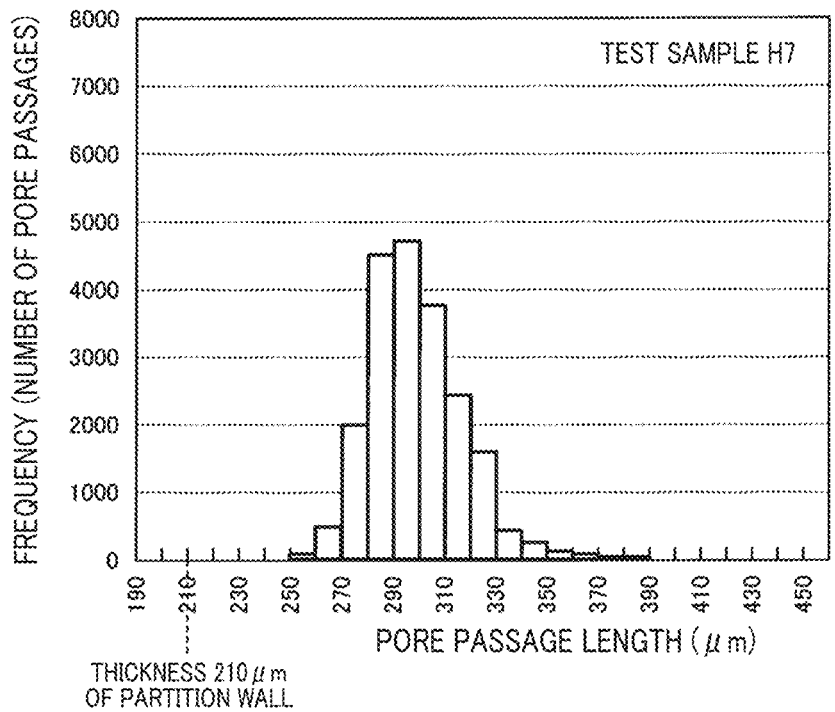
FIG. 20 is a view showing a frequency histogram of pore passage lengths in test sample H7 according to the second experiment.

FIG. 14 is an enlarged cross sectional view showing a schematic structure of pores 121 formed in the partition wall 12 of the cell 13 in the honeycomb structure body 1 mounted on the exhaust gas purification filter according to the first exemplary embodiment. As shown in FIG. 14, the exhaust gas purification filter 3 has the honeycomb structure body 1 and catalyst 2. In the exhaust gas purification filter 3, the catalyst 2 is supported on the porous walls 122*a* of the communicating pores 122 in the honeycomb structure body 1.

It is sufficient that the catalyst 2 is supported on the surface of at least the porous walls 122*a* of the communicating pores 122. In addition to this structure, it is possible that the catalyst 2 is further supported on the surface of the partition walls 12 (i.e. the surface of the partition walls 12 facing the cells 1). In order to support the catalyst 2 on the porous walls 122*a* of the communicating pores 122, there is a known in-wall coating method of feeding a slurry containing catalyst into the inside of the pores 122 by suction. It is possible to select the type of the catalyst 2 according to requirements. For example, it is acceptable to support noble metal such as Pt, Rh, Pd as catalyst and co-catalyst simultaneously on the surface of the porous walls 122*a* of the communicating pores 122.

In the exhaust gas purification filter 3, adjacent cells 13, which are adjacently arranged, are communicated together through the communicating pores 122 in the partition walls which form the adjacent cells 13. That is, the exhaust gas purification filter 3 has the communicating pores 122 after the catalyst support process, i.e. even 1*f* the catalyst 2 is supported on the surface of the porous walls 122*a* and the surface of the partition walls 12. The overall communicating pores 122*a* are not clogged by the catalyst 2 by performing the catalyst support process. That is, in the honeycomb structure body 1 having the improved structure, many communicating pores 122 are not clogged by the clay with the catalyst 2, and remained in the exhaust gas purification filter 3 after the catalyst support process.

Because the exhaust gas purification filter 3 is equipped with the honeycomb structure body 1 and the catalyst 2, this structure makes it possible to suppress deterioration of the PM collection rate and the pressure loss due to the catalyst support. The exhaust gas purification filter 3 can be applied to petroleum engines so as to purify exhaust gas emitted from the engines with high efficiency.

It is possible for the exhaust gas purification filter 3 to have the catalyst 2 of not less than 30 g/liter. In general, in the catalyst support process in which the catalyst 2 is supported on the surface of the porous walls 122*a* of the communicating pores 122, a shape of each pore 121 varies. However, as previously described in detail, even 1*f* the catalyst 2 of not less than 30 g/liter has been supported, the improved structure of the honeycomb structure body 1 according to the first exemplary embodiment can suppress the deterioration of the PM collection rate and the pressure loss after the catalyst support process.

From the viewpoint of maintaining the necessary purification performance of purifying exhaust gas containing PM such as HC, CO and NO and the necessary oxygen occlusion quantity of the catalyst, it is preferable for the exhaust gas purification filter 3 to have the catalyst 2 of not less than 30 g/liter, and more preferably to use the catalyst 2 of not less than 50 g/liter, and most preferably to use the catalyst 2 of not less than 60 g/liter.

From the viewpoint of suppressing a clogging phenomenon of the communicating pores 122 during the catalyst support process performed by the in-wall coating method, and of suppressing damage to the honeycomb structure body 1 by thermal stress due to catalyst reaction thermal energy, it is preferable for the exhaust gas purification filter 3 to have the catalyst 2 at an amount of not more than 200 g/liter, more preferably to have the catalyst 2 at an amount of not more than 150 g/liter, and most preferably to have the catalyst 2 at an amount of not more than 100 g/liter.

It is preferable for the exhaust gas purification filter 3 to have the communicating pores 122 at a density of not less than 4500 [pores/0.25 mm$^2$], where the communicating pores 122 formed in the partition walls 12 allow exhaust gas to pass between the adjacent cells 13. This structure makes it possible to suppress deterioration of the PM collection rate and the pressure loss even 1*f* the catalyst 2 is supported in the honeycomb structure body 1 to form the exhaust gas purification filter 3.

Further, because the total number of pores reducing the strength of the exhaust gas purification filter 3 is reduced, this structure makes it possible to suppress damage to the exhaust gas purification filter 3 when the exhaust gas purification filter 3 is assembled to the exhaust gas pipe joined to the internal combustion engine (not shown).

It is preferable for the exhaust gas purification filter 3 to have communicating pores 122 at a density of not less than 4800 [pores/0.25 mm$^2$] capable of allowing exhaust gas to pass through the adjacent cells 13 when the catalyst 2 has been supported by the partition walls 12. Further, it is more preferable for the exhaust gas purification filter 3 to have communicating pores 122 at a density not less than 5000 [pores/0.25 mm$^2$], more preferably to have communicating pores 122 at a density of not less than 5200 [pores/0.25 mm$^2$], more preferably to have communicating pores 122 at a density of not less than 5300 [pores/0.25 mm$^2$], still more preferable to have communicating pores 122 at a density of not less than 5400 [pores/0.25 mm$^2$], and most preferably to have communicating pores 122 at a density of not less than 5800 [pores/0.25 mm$^2$].

From the viewpoint of maintaining the strength of the exhaust gas purification filter 3, it is acceptable to have communicating pores 122 at a density of not more than 8500 [pores/mm$^2$] which allow exhaust gas to pass through the adjacent cells 13 after the catalyst support, i.e. the catalyst 2 has been supported by the communicating pores 122 in the partition walls 12.

It is possible for the method previously described to detect and calculate the number of the communicating pores 122 capable of allowing exhaust gas to pass through the adjacent cells 13 when the catalyst 2 has been supported by the partition walls 12 in the honeycomb structure body 1.

It is preferable to adjust the average pore diameter of the partition walls 12 supporting the catalyst 2 to be within a range of not less than 10 μm and not more than 28 μm, preferably to be within a range of not less than 11 μm and not more than 26 μm, more preferably to be within a range of not less than 13 μm and not more than 23 μm.

Further, it is preferable to adjust the porosity of the partition walls 12 supporting the catalyst 2 to be within a range of not less than 46% and not more than 66%, more preferably to be within a range of not less than 49% and not more than 64%, and most preferably to be within a range of not less than 51% and not more than 61%.

It is preferable for the pores 121 to reliably support the catalyst 2 when the partition walls 12 supporting the catalyst 2 have the average pore diameter to be within the range of not less than 10 μm and not more than 28 μm, and have the porosity to be within the range of not less than 46% and not more than 66%. Further, this makes it possible to reliably suppress deterioration of the PM collection rate and the pressure loss when the catalyst 2 is supported by the pores 121.

It is possible to use the mercury press-in method, which will be explained in the description regarding experiments later.

Second Exemplary Embodiment

A description will be given of the honeycomb structure body 1 and the exhaust gas purification filter 3 according to a second exemplary embodiment with reference to FIG. 1 to FIG. 14. The same components between the first exemplary embodiment and the second exemplary embodiment will be referred to the same reference numbers and characters. The explanation of the same components between the first exemplary embodiment and the second exemplary embodiment is omitted here for brevity.

The honeycomb structure body 1 according to the second exemplary embodiment has a curve ratio LIT at a value of not less than 1.2, where L/T indicates a ratio of a thickness T (μm) of the partition walls to an average passage length L (μm) of the communicating pores 122 formed in the partition walls 12.

It is possible to calculate the average passage length L (μm) of the communicating pores 122 by the following method. Similar to the method according to the first exemplary embodiment, a binary image obtained from the CT scan image is prepared. A three dimensional (3D) virtual model of the binary image of the CT scan image is obtained by using the analysis software GeoDict® produced by Math2Market GmbH. The analysis software GeoDict® reads the binary image of the CT scan image and generates a 3D virtual model of the pores and the solid parts in the binary image of the CT scan image.

Next, a pore passage length (μm) of the overall communicating pores 122 is calculated on the basis of the 3D virtual model.

PM flows along the flow of the exhaust gas in the honeycomb structure body. In general, because the exhaust gas flows in a minimum length passage formed by the communicating pores 122, the pore passage length (μm) is a minimum length of the passage formed by the communicating pores 122. In other words, the pore passage length formed by the communicating pores 122 does not always correspond to the line obtained by connecting the center points in diameter of the communicating pores 122. The average value of the pore passage lengths of the communicating pores 122 corresponds to the average passage length L (μm) of the communicating pores 122. The thickness (μm) of the 3D virtual model corresponds to the thickness T (μm) of the partition wall 12, which is used for calculating the curve ratio LIT.

As previously described, the curve ratio L/T of the measurement sample is calculated by dividing the average passage length L (μm) of the communicating pores 122 by the thickness T (μm) of the partition wall 12. The curve ratio L/T of the honeycomb structure body 1 is calculated on the basis of the average value of the curve ratios of the six measurement samples selected and extracted from the honeycomb structure body 1. The six measurement samples are extracted from the measurement samples at the same positions when the number of communicating pores was calculated in the first exemplary embodiment previously described.

The honeycomb structure body 1 according to the second exemplary embodiment has the curve ratio L/T to be within the specific range previously described. When the curve ratio L/T is out of the specific range, i.e. not less than 1.2, the gas flow passage formed by the communicating pores 122 becomes complicated, and this increases a pipe resistance due to the abrasion of the exhaust gas pipe as a resistance of the communicating pores 122. For this reason, the feeding speed of the slurry is reduced due to the pipe resistance and this makes it possible for the porous walls 122a of the communicating pores 122 to easily support a necessary amount of the slurry with the catalyst 2 when the catalyst 2 is supported by the honeycomb structure body 1.

From the viewpoint of improving the catalyst support capability of the communicating pores 122, it is preferable for the honeycomb structure body 1 to have the curve ratio at a value of not less than 1.25, more preferably to have the curve ratio at a value of not less than 1.30, and most preferably to have the curve ratio at a value of not less than 1.35.

When the honeycomb structure body 1 has an excessive curve ratio which is more than the above range, the number of the pores 121 clogged by the catalyst 2 increases during the catalyst support process in the production of the honeycomb structure body 1. Accordingly, it is preferable for the honeycomb structure body 1 to have the curve ratio at a value of not more than 1.8, more preferably to have the curve ratio at a value of not more than 1.7, and most preferably to have the curve ratio at a value of not more than 1.6.

The exhaust gas purification filter 3 according to the second exemplary embodiment is equipped with the honeycomb structure body 1 having the improved structure previously described, which is different from the structure of the honeycomb structure body 1 according to the first exemplary embodiment. The honeycomb structure body 1 according to the second exemplary embodiment reliably supports the catalyst 2 of a necessary amount because of having the improved structure previously described.

In the exhaust gas purification filter 3 having the improved structure previously described, the curve ratio is not less than 1.4 when the communicating pores 122 have supported the catalyst 2. It is possible to calculate the curve ratio when the communicating pores 122 have supported the catalyst 2 by using the honeycomb structure body 1 in which the communicating pores 122 have supported the catalyst 2.

The exhaust gas purification filter 3 according to the second exemplary embodiment has the curve ratio previously described after the catalyst support. It is accordingly possible for the porous walls 122a of the communicating pores 122 to reliably support the catalyst 2 when the curve ratio is to be within the specific range previously explained.

From the viewpoints of improving the PM collection rate and of suppressing the pressure loss of the exhaust gas purification filter 3 when the communicating pores 122 have supported the catalyst 2, it is possible to have a curve ratio at a value of not less than 1.45 and more preferably to use the curve ratio at a value of not less than 1.50. Further, it is more preferable to use the curve ratio at a value of not less than 1.55, and most preferably to use the curve ratio at a value of not less than 1.6. There is a tendency for the pressure loss to increase when the curve ratio becomes an excessive value. Accordingly, it is preferable for the exhaust gas purification filter 3 to have the curve ratio at a value of not more than 2.2, more preferably to have the curve ratio at a value of not more than 2.1, and still more preferably to have the curve ratio at a value of not more than 2.0.

In addition to this, the exhaust gas purification filter 3 according to the second exemplary embodiment has the same behavior and effects of the exhaust gas purification filter 3 according to the first exemplary embodiment.

Third Exemplary Embodiment

A description will be given of the exhaust gas purification filter 3 according to a third exemplary embodiment with reference to FIG. 1 to FIG. 14. The exhaust gas purification filter 3 according to the third exemplary embodiment has the honeycomb structure body 1 and the catalyst 2. The honeycomb structure body 1 has the outer skin 11, the partition walls 12 and the cells 13. The outer skin 11 is formed to have a cylindrical shape, for example. The inner area of the outer skin 11 is partitioned by the partition walls 12. A plurality of pores 121 are formed in the partition walls 12. Each of the cells 13 is surrounded by the partition walls 12. In particular, the communicating pores 122 are formed in each of the partition walls 12 so as to communicate the adjacent cells 3 arranged adjacently each other.

The porous walls 122a of the communicating pores 122 support the catalyst 2. The exhaust gas purification filter 3 has supported the catalyst 2 at an amount of not less than 30 g/liter. In the exhaust gas purification filter 3, the number of the communicating pores 122 has a density of not less than 4500 [pores/0.25 mm$^2$] after the catalyst support, where the communicating pores 122 with the catalyst 2 formed in the partition walls 12 allow exhaust gas to pass through between the adjacent cells 13.

The exhaust gas purification filter 3 according to the third exemplary embodiment uses the honeycomb structure body 1 which includes the communicating pores 122 at a density of not less than 18000 [pores/0.25 mm$^2$] before the catalyst support according to the first and second exemplary embodiments previously described. The third exemplary embodiment produces the exhaust gas purification filter 3 by using the known in-wall coating method which feeds a slurry containing the catalyst 2 at an amount of not less than 30 [g/liter] into the inside of the pores 121 in the honeycomb structure body 1 by suction.

The structure of the exhaust gas purification filter 3 according to the third exemplary embodiment makes it possible to suppress deterioration of the PM collection rate and the pressure loss due to the catalyst support. The exhaust gas purification filter 3 according to the third exemplary embodiment has the same behavior and effects of the exhaust gas purification filter 3 according to the first and second exemplary embodiments.

First Experiment

A description will be given of a first experiment with reference to experimental results shown in Table 1, Table 2 and Table 3.

It is possible to use cordierite as a main raw material to be used for producing a honeycomb structure body. That is, a cordierite forming raw material containing Si source, Al source and Mg source is used so as to produce the honeycomb structure body of a necessary cordierite composition. That is, the cordierite forming raw material generates a necessary cordierite composition when fired.

It is possible to use, as the cordierite forming raw material, a mixture powder of silica, talc, aluminum hydroxide, alumina, kaolin, etc. It is preferable to use a porous silica as silica. From the viewpoint of increasing the porosity of the partition walls in a honeycomb structure body, it is preferable to use aluminum hydroxide as Al source.

In the production of the honeycomb structure body, a necessary amount of water, a binder, a lubricant, and a pore forming material, etc. are added to the cordierite forming raw material and mixed them so as to produce a clay.

The second experiment will explain a mixing condition of the cordierite forming raw material during the production of the clay. The clay is extruded and molded to produce a green body. The green body is fired. After the firing process, plug members are formed in the fired body so as to produce the honeycomb structure body.

In order to form the communicating pores formed in the partition walls in the honeycomb structure body, the number of which becomes to be within the specific value of 18000 [pores/0.25 mm$^2$] previously explained in the first, second and third exemplary embodiments, it is effective to form the communicating pores having a uniform distribution of the pore passage lengths in the partition walls.

A description will now be given of the condition of raw materials to form the communicating pores having a uniform distribution of the pore passage lengths.

Because silica and talc are fused at a high temperature and fused silica and talc form pores, silica and talc are pore forming materials. The higher a particle number ratio of particles of the pore forming materials (i.e. silica and talc) to the particles of the overall raw materials is, the easier the particles of the pore forming material are in contact together. As a result, the pore passage lengths of the communicating pores become more uniform. Accordingly, in order to produce the communicating pores of the pore passage lengths in a uniform distribution, it is possible to adjust the particle number ratio of silica and talc in the clay including the cordierite forming raw material in the extrusion molding process.

However, it is generally difficult to calculate the particle number ratio of silica and talc with a high accuracy, and the calculation results of the particle number ratio often vary due to the molding condition in the extrusion and molding process. Accordingly, it is preferable to adjust the raw powder of silica, talc and Al source so as to control the distribution of the pore passage lengths of the communicating pores. The first experiment has adjusted the pressure bulk density of the raw powder as an index to control the distribution of the pore passage lengths of the communicating pores.

Specifically, the first experiment used test sample 1 to test sample 5, test sample 1C and test sample 2C. As shown in Table 1, each of test sample 1 to test sample 5, test sample 1C and test sample 2C had a different composition of porous silica or fused silica, talc, and aluminum hydroxide so as to form the cordierite forming raw material. The description will use the average particle size which represents a particle diameter at 50% of a volume integrated value in the particle distribution obtained by the laser differential scattering method. In general, a pore forming material made of graphite, water, lubricant, a binder made of methylcellulose were added to the cordierite forming raw material. The first experiment produced the clay made of the mixture of the raw materials previously described.

TABLE 1

|  | TEST SAMPLE 1 | | TEST SAMPLE 2 | | TEST SAMPLE 3 | | TEST SAMPLE 4 | |
| --- | --- | --- | --- | --- | --- | --- | --- | --- |
|  | AVERAGE PARTICLE SIZE (μm) | BLENDING RATIO (wt %) | AVERAGE PARTICLE SIZE (μm) | BLENDING RATIO (wt %) | AVERAGE PARTICLE SIZE (μm) | BLENDING RATIO (wt %) | AVERAGE PARTICLE SIZE (μm) | BLENDING RATIO (wt %) |
| POROUS SILICA | 21 (A) | 20.5 | 16 (B) | 20.5 | 21 (C) | 20.5 | 16 (B) | 20.5 |
| FUSED SILICA | — | — | — | — | — | — | — | — |
| TALC | 35 | 35.3 | 14 | 35.3 | 20 | 35.3 | 20 | 35.3 |
| ALUMINUM HYDROXIDE | 5 | 44.2 | 3 | 13.3 | 3 | 13.3 | 3 | 22.1 |
|  | — | — | 8 | 30.9 | 8 | 30.9 | 8 | 22.1 |
| METHYLCELLULOSE | — | 9 | — | 9 | — | 9 | — | 9 |
| GRAPHITE | 25 | 20 | — | — | — | — | — | — |
| LUBRICANT | — | 5.5 | — | 5.5 | — | 5.5 | — | 5.5 |
| WATER | — | 46 | — | 34 | — | 34 | — | 66 |

|  | TEST SAMPLE 5 | | TEST SAMPLE 1C | | TEST SAMPLE 2C | |
| --- | --- | --- | --- | --- | --- | --- |
|  | AVERAGE PARTICLE SIZE (μm) | BLENDING RATIO (wt %) | AVERAGE PARTICLE SIZE (μm) | BLENDING RATIO (wt %) | AVERAGE PARTICLE SIZE (μm) | BLENDING RATIO (wt %) |
| POROUS SILICA | 21 (A) | 20.5 | — | — | — | — |
| FUSED SILICA | — | — | 30 (A) | 19.4 | 45 (B) | 19.4 |
| TALC | 35 | 35.3 | 35 | 35.4 | 40 | 35.4 |
| ALUMINUM HYDROXIDE | 5 | 44.2 | — | — | — | — |
|  | — | — | 8 | 45.2 | 8 | 45.2 |
| METHYLCELLULOSE | — | 9 | — | 9 | — | 9 |
| GRAPHITE | — | — | 25 | 20 | 25 | 20 |
| LUBRICANT | — | 5.5 | — | 5.5 | — | 5.5 |
| WATER | — | 45 | — | 34 | — | 34 |

In order to evaluate the clay used for forming each test sample, the pressure bulk density was detected. The first experiment used as a pressure measuring device, an Auto-Graph AGX-V (manufactured by Shimadzu Corporation). A mixture powder as the cordierite raw forming material was added into a vessel of the pressure measuring device. The vessel has 25 mm in diameter and 20 mm in height. A necessary pressure was continuously applied to the mixture powder. The added pressure was increased at a pressure speed of 1 mm/min. The pressure was added to the mixture power until the added pressure reached the load of 7 kN corresponding to 15 MPa. This produced a cylindrical-shaped pellet made of the mixture powder. The first experiment measured a weight and a height of the produced pellet.

It is possible to measure the height of the produced pellet by using a Vernier caliper, a micrometer, a three dimensional (3D) measurement apparatus. The first experiment used a micrometer so as to measure the height of the produced pellet. Because the produced pellet had a diameter of 25 mm, a volume of the produced pellet was calculated on the basis of the diameter and the measured height.

A density of the produced pellet was calculated on the basis of the volume and weight thereof. The calculated density was divided by volume so as to obtain the pressure bulk density.

A methylcellulose 65MP-4000 (produced by the Matsumoto Yushi-Seiyaku Co., Ltd.) was added as the binder to the mixture power as the cordierite forming raw material. The use of the binder allows the produced pellet made of the mixture powder to be easily handled. Specifically, the first experiment added the binder of 0.5 g to the cordierite forming raw material of 1.5 g so as to obtain the mixture powder of 2 g. It is acceptable to use another type of binder.

In general, there is a correlation between the particle size and the bulk density. The smaller the particle size is, the smaller the bulk density becomes because a gap between the particles. This reduces the bulk density. The number of the particles in a volume increases when the particle size is reduced. The smaller the bulk density is, the greater the number of the particles is. That is, the bulk density and the number of particles are in inverse proportion.

It is possible to calculate the particle number rate R of the pore forming material in the mixture powder by using the following formula (x).

$$R = N_{ST}/N_M \quad (x),$$

where $N_{ST}$ is the number of particles of silica and talc, and the total number $N_M$ of particles of the overall raw material mixture powder.

When the relationship between the bulk density and the number of particles previously described is applied to the formula (x), the particle number ratio R of the pore forming material is expressed by the following formula (xi).

$$R = \rho_M/\rho_{ST} \quad (xi),$$

where $\rho_M$ indicates a pressure bulk density of the overall raw material mixture powder, and $\rho_{ST}$ indicates a pressure bulk density of the mixture powder of silica and talc.

Because the first experiment used the raw material mixture powder composed of silica, talc and aluminum hydroxide, the pressure bulk density $\rho_M$ indicates a pressure bulk density of the mixture powder of silica, talc and aluminum hydroxide. Accordingly, it is possible to increase the particle number rate R of the pore forming material by increasing the pressure bulk density of aluminum hydroxide and by reducing the pressure bulk density of the mixture powder composed of silica and talc.

The first experiment calculated the ratio $\rho_A/\rho_{ST}$ as the index of the particle number ratio R of the pore forming material composed of silica and talc, where $\rho_A$ represents the pressure bulk density of aluminum hydroxide. Table 2 shows the ratio $\rho_A/\rho_{ST}$, and the pressure bulk density $\rho_{ST}$ and $\rho_A$ of test sample 1 to test sample 5.

Table 3 shows a relationship of the type of porous silica and fused silica (shown in Table 1), and the bulk density of each of test samples 1 to 5, 1C and 2C detected by a Tapping density measuring instrument (manufactured by SEISHIN ENTERPRISE Co., Ltd.) That is, the first experiment used the fluidity adhesion tester based on the tapping density measuring method so as to detect, i.e. measure the bulk density of test samples 1 to 5, 1C and 2C.

Next, the first experiment pressed silica powder by using the tapping density measurement instrument, and calculated the bulk density of test samples 1 to 5, 1C and 2C based on a volume of the compressed silica and the volume of the cylinder. Table 3 shows the calculation results of the bulk density of test samples 1 to 5, 1C and 2C.

size of 5 μm only. test sample 2 and test sample 3 used a mixture powder of aluminum hydroxide having a mixture ratio of 3:7, where aluminum hydroxide having an average particle size of 3 μm is the small diameter powder, and aluminum hydroxide having an average particle size of 8 μm is the large diameter powder.

test sample 4 used a mixture powder of aluminum hydroxide having a mixture ratio of 5:5, where aluminum hydroxide having an average particle size of 3 μm is the small diameter powder, and aluminum hydroxide having an average particle size of 8 μm is the large diameter powder.

As shown in Table 2, it can be understood that the mixture powder of aluminum hydroxide having a mixture ratio in which the small diameter powder within the range of 30 to 50 mass % approximately has the same pressure bulk density.

As can be understood from the results shown in Table 2, test sample 2, test sample 3 and test sample 4 had a large pressure bulk density when compared with that of test sample 1 and test sample 5 which used aluminum hydroxide

TABLE 2

| | TEST SAMPLE No. | | | | |
|---|---|---|---|---|---|
| | TEST SAMPLE 1 | TEST SAMPLE 2 | TEST SAMPLE 3 | TEST SAMPLE 4 | TEST SAMPLE 5 |
| PRESSURE BULK DENSITY $\rho_{ST}$ (g/cm³) OF MIXTURE POWDER OF POROUS SILICA AND TALC | 0.91 | 0.76 | 0.79 | 0.79 | 0.91 |
| PRESSURE BULK DENSITY $\rho_A$ (g/cm³) OF ALUMINUM HYDROXIDE | 1.42 | 1.56 | 1.56 | 1.56 | 1.42 |
| PARTICLE RATIO $\rho_A/\rho_{ST}$ (g/cm³) OF PORE FORMING MATERAL MADE OF POROUS SILICA AND TALC | 1.56 | 2.05 | 1.97 | 1.97 | 1.56 |

TABLE 3

| TEST SAMPLE No. | TEST SAMPLE 1 | TEST SAMPLE 2 | TEST SAMPLE 3 | TEST SAMPLE 4 | TEST SAMPLE 5 | TEST SAMPLE 1C | TEST SAMPLE 2C |
|---|---|---|---|---|---|---|---|
| KIND OF SILICA | POROUS SILICA A | POROUS SILICA B | POROUS SILICA C | POROUS SILICA B | POROUS SILICA A | FUSED SILICA A | FUSED SILICA B |
| BULK DENSITY (g/cm³) DETECTED BY TAPPING DENSITY MEASURING INSTRUMENT | 0.51 | 0.22 | 0.26 | 0.22 | 0.51 | 1.35 | 1.38 |

As can be understood from the results shown in Table 3, test sample 2, test sample 3 and test sample 4 used respective porous silica B, porous silica C and porous silica B having a low bulk density detected by the tapping density measurement instrument. As can be understood from the results shown in Table 2, test sample 2, test sample 3 and test sample 4 using the mixture powder of porous silica and talc of a low pressure bulk density $\rho_{ST}$.

It is possible to increase the bulk density of the aluminum hydroxide due to an increased fillability when aluminum hydroxide is composed of a large diameter powder having a relatively large particle size and a small diameter powder having a small particle size. That is, in general, it is possible to increase the fillability of aluminum hydroxide composed of the large diameter powder and the small diameter powder when the small diameter powder is to be within a range of 5 to 35 mass %.

However, an optimum composition of the large diameter powder and the small diameter powder varies due to a combination of particle sizes, shape of particles, distribution of particles, etc.

As shown in Table 1, test sample 1 and test sample 5 used a powder of aluminum hydroxide having an average particle having the same average particle size, i.e. without blending aluminum hydroxide having a different average particle size.

As shown in Table 2, test samples 1 to 5 have the following relationship of the ratio of the number of particles of porous silica to talc: test sample 1 and test sample 5<test sample 3 and test sample 4<test sample 2.

That is, it is possible to increase the particle number ratio of the pore forming materials in the raw material mixture powder when the pressure bulk density of aluminum hydroxide is increased and the pressure bulk density of the mixture powder composed of porous silica and talc is reduced.

That is, it is possible to improve a degree in contact between the particles and to have a uniform distribution of the pore passage lengths when the pressure bulk density of aluminum source (Al source) and the pressure bulk density of the pore forming material are adjusted, and the particle number ratio of the pore forming material is increased.

As previously described, the first experiment calculated the particle number ratio of the pore forming materials, i.e. the porous silica and talc on the basis of the ratio $\rho_A/\rho_{ST}$, where $\rho_A$ represents the pressure bulk density of aluminum hydroxide and $\rho_{ST}$ indicates a pressure bulk density of the mixture powder of silica and talc. However, the concept of the present invention is not limited by this. For example, it is possible to use a pressure bulk density of the cordierite forming raw materials instead of using the pressure bulk density $\rho_A$ of aluminum hydroxide.

That is, it is acceptable to calculate the particle number ratio of the pore forming materials composed of porous silica and on the basis of the ratio $\rho_M/\rho_{ST}$, where $\rho_M$ indicates the pressure bulk density of the overall raw material mixture powder, and $\rho_{ST}$ indicates a pressure bulk density of the mixture powder of silica and talc.

Specifically, when the cordierite forming raw materials contain kaolin and alumina, it is possible to use a pressure bulk density of a mixture powder composed of the cordierite forming raw materials containing kaolin and alumina.

When the cordierite forming raw materials contain a pore forming material, it is possible to use a pressure bulk density of a mixture powder composed of the cordierite forming raw materials containing the pore forming material.

Further, when it is acceptable to reduce the porosity of the partition walls, it is possible to allow alumina, having a particle size which is different from a particle size of aluminum hydroxide, to be added into the mixture powder containing aluminum hydroxide.

In the mixture powder of aluminum hydroxide and alumina, it is acceptable to use aluminum hydroxide having an average particle size only, or to use not less than two types of aluminum hydroxide having a different particle size. Similarly, it is possible to use only alumina having an average particle size, or to use not less than two types of aluminum hydroxide having a different particle size. Further, it is acceptable to use, as Al source, alumina instead of using aluminum hydroxide. It is possible to change the combination of the components forming the mixture powder based on a molding factor, a shrinkage factor, a production cost, etc.

Second Experiment

A description will be given of the second experiment with reference to experimental results shown in Table 4, Table 5, Table 6, FIG. 1, FIG. 18, FIG. 20, FIG. 21 and FIG. 22.

The second experiment produced test samples H1 to H12 as twelve types of honeycomb structure bodies having the communicating pores different in number. A description will now be given of the method of producing each of test samples H1 to H12. As shown in Table 4 and Table 5, each of test sample H1 to test sample H12 had a different composition of the cordierite forming raw materials, an amount of each of which was adjusted.

As shown in Table 4 and Table 5, the second experiment produced each test sample by adjusting a composition of silica, talc, and aluminum hydroxide so as to form the cordierite raw material.

As shown in Table 4 and Table 5, a necessary amount of a pore forming material made of graphite, water, lubricant, a binder made of methylcellulose were added to the cordierite forming raw material of each test sample. A clay was produced by using the mixture raw powder composed of the cordierite forming raw material and the above additives. In particular, in order to improve the communication degree caused by the particle contacts and to improve the curve ratio, the clay forming each of test sample H1, H4 and H7 were mixed for a long period of time which is longer than a usual clay mixing period of time within a range of 30 minutes to two hours.

However, the clay mixing period becomes an excess long time, water is vapored. This reduces a necessary clay molding factor. Accordingly, the second experiment used the clay mixing period of test sample H1, test sample H4 and test sample H7 which was within 1.3 times to 1.6 times of the usual clay mixing period. The clay was extruded and molded to produce a green body. The green body was fired at a temperature of 1410° C. After this, the plug members were formed so as to produce the honeycomb structure bodies of test sample H1 to test sample H12. Each of the honeycomb structure bodies of test sample H1 to test sample H12 had a cylindrical shape of 132 mm in diameter, 101 mm in length in the axial direction. Table 6 shows a thickness of the partition walls in each of test sample H1 to test sample H12. Cells form in each of test sample H1 to test sample H12 had a square shape shown in FIG. 1.

TABLE 4

| | TEST SAMPLE H1 | | TEST SAMPLE H2 | | TEST SAMPLE H3 | |
|---|---|---|---|---|---|---|
| | AVERAGE PARTICLE SIZE (μm) | BLENDING RATIO (wt %) | AVERAGE PARTICLE SIZE (μm) | BLENDING RATIO (wt %) | AVERAGE PARTICLE SIZE (μm) | BLENDING RATIO (wt %) |
| POROUS SILICA | 16 | 20.5 | — | 0 | 21 | 20.5 |
| FUSED SILICA | — | 0 | 30 | 19.4 | — | 0 |
| TALC | 35 | 35.3 | 35 | 35.4 | 35 | 35.3 |
| ALUMINUM HYDROXIDE | 4 | 44.2 | 8 | 45.2 | 5 | 44.2 |
| | — | 0 | — | 0 | — | 0 |
| METHYLCELLULOSE | — | 9 | — | 9 | — | 9 |
| GRAPHITE | — | — | 25 | 20 | 25 | 20 |
| LUBRICANT | — | 5.5 | — | 5.5 | — | 5.5 |
| WATER | — | 45 | — | 34 | — | 46 |
| PRESSURE BULK DENSITY $\rho_{ST}$ (g/cm$^3$) OF MIXTURE POWDER OF POROUS SILICA AND TALC | 0.79 | | — | | 0.91 | |
| PRESSURE BULK DENSITY $\rho_A$ (g/cm$^3$) OF ALUMINUM HYDROXIDE | 1.62 | | — | | 1.42 | |
| PARTICLE RATIO $\rho_A/\rho_{ST}$ (g/cm$^3$) OF PORE FORMING MATERAL MADE OF POROUS SILICA AND TALC | 2.05 | | — | | 1.56 | |

TABLE 4-continued

|  | TEST SAMPLE H4 | | TEST SAMPLE H5 | | TEST SAMPLE H6 | |
| --- | --- | --- | --- | --- | --- | --- |
|  | AVERAGE PARTICLE SIZE (μm) | BLENDING RATIO (wt %) | AVERAGE PARTICLE SIZE (μm) | BLENDING RATIO (wt %) | AVERAGE PARTICLE SIZE (μm) | BLENDING RATIO (wt %) |
| POROUS SILICA | 16 | 20.5 | 21 | 20.5 | 16 | 20.5 |
| FUSED SILICA | — | 0 | — | 0 | — | 0 |
| TALC | 35 | 35.3 | 20 | 35.3 | 20 | 35.3 |
| ALUMINUM HYDROXIDE | 5 | 44.2 | 3 | 13.3 | 3 | 22.1 |
|  | — | 0 | 8 | 30.9 | 8 | 22.1 |
| METHYLCELLULOSE | — | 9 | — | 9 | — | 9 |
| GRAPHITE | 25 | 20 | — | 0 | — | 0 |
| LUBRICANT | — | 5.5 | — | 5.5 | — | 5.5 |
| WATER | — | 46 | — | 34 | — | 66 |
| PRESSURE BULK DENSITY $\rho_{ST}$ (g/cm$^3$) OF MIXTURE POWDER OF POROUS SILICA AND TALC |  | 0.76 |  | 0.79 |  | 0.79 |
| PRESSURE BULK DENSITY $\rho_A$ (g/cm$^3$) OF ALUMINUM HYDROXIDE |  | 1.56 |  | 1.56 |  | 1.56 |
| PARTICLE RATIO $\rho_A/\rho_{ST}$ (g/cm$^3$) OF PORE FORMING MATERAL MADE OF POROUS SILICA AND TALC |  | 2.05 |  | 1.97 |  | 1.97 |

TABLE 5

|  | TEST SAMPLE H7 | | TEST SAMPLE H8 | | TEST SAMPLE H9 | |
| --- | --- | --- | --- | --- | --- | --- |
|  | AVERAGE PARTICLE SIZE (μm) | BLENDING RATIO (wt %) | AVERAGE PARTICLE SIZE (μm) | BLENDING RATIO (wt %) | AVERAGE PARTICLE SIZE (μm) | BLENDING RATIO (wt %) |
| POROUS SILICA | 21 | 20.5 | 16 | 20.5 | 21 | 20.5 |
| FUSED SILICA | — | 0 | — | 0 | — | 0 |
| TALC | 35 | 35.3 | 35 | 35.3 | 35 | 35.3 |
| ALUMINUM HYDROXIDE | 5 | 44.2 | 3 | 44.2 | 3 | 22.1 |
|  | — | — | — | 0 | 5 | 22.1 |
| METHYLCELLULOSE | — | 9 | — | 9 | — | 9 |
| GRAPHITE | — | — | 25 | 20 | 25 | 20 |
| LUBRICANT | — | 5.5 | — | 5.5 | — | 5.5 |
| WATER | — | 45 | — | 46 | — | 46 |
| PRESSURE BULK DENSITY $\rho_{ST}$ (g/cm$^3$) OF MIXTURE POWDER OF POROUS SILICA AND TALC |  | 0.91 |  | 0.76 |  | 0.91 |
| PRESSURE BULK DENSITY $\rho_A$ (g/cm$^3$) OF ALUMINUM HYDROXIDE |  | 1.42 |  | 1.69 |  | 1.52 |
| PARTICLE RATIO $\rho_A/\rho_{ST}$ (g/cm$^3$) OF PORE FORMING MATERAL MADE OF POROUS SILICA AND TALC |  | 1.56 |  | 2.22 |  | 1.67 |

|  | TEST SAMPLE H10 | | TEST SAMPLE H11 | | TEST SAMPLE H12 | |
| --- | --- | --- | --- | --- | --- | --- |
|  | AVERAGE PARTICLE SIZE (μm) | BLENDING RATIO (wt %) | AVERAGE PARTICLE SIZE (μm) | BLENDING RATIO (wt %) | AVERAGE PARTICLE SIZE (μm) | BLENDING RATIO (wt %) |
| POROUS SILICA | 21 | 20.5 | 21 | 20.5 | 21 | 20.5 |
| FUSED SILICA | — | 0 | — | 0 | — | 0 |
| TALC | 35 | 35.3 | 35 | 35.3 | 35 | 35.3 |
| ALUMINUM HYDROXIDE | 5 | 44.2 | 5 | 44.2 | 5 | 44.2 |
|  | — | — | — | — | — | — |
| METHYLCELLULOSE | — | 9 | — | 9 | — | 9 |
| GRAPHITE | — | — | 25 | 20 | 25 | 20 |

TABLE 5-continued

| | | | | | | |
|---|---|---|---|---|---|---|
| LUBRICANT | — | 5.5 | — | 5.5 | — | 5.5 |
| WATER | — | 45 | — | 46 | — | 46 |
| PRESSURE BULK DENSITY $\rho_{ST}$ (g/cm³) OF MIXTURE POWDER OF POROUS SILICA AND TALC | 0.90 | | 0.81 | | 0.79 | |
| PRESSURE BULK DENSITY $\rho_A$ (g/cm³) OF ALUMINUM HYDROXIDE | 1.52 | | 1.69 | | 1.69 | |
| PARTICLE RATIO $\rho_A / \rho_{ST}$ (g/cm³) OF PORE FORMING MATERAL MADE OF POROUS SILICA AND TALC | 1.69 | | 2.08 | | 2.14 | |

[Porosity and Average Pore Diameter]

A porosity and an average pore diameter of the partition wall in the honeycomb structure body as each of test sample H1 to test sample H12 were measured by using an auto-pore as a mercury porosimeter (manufactured by Shimadzu Corporation) on the basis of the mercury press-in method. The measuring conditions are as follows.

Each test sample was cut and separated from the honeycomb structure body as each of test samples H1 to H12. Each test sample has a rectangular prism having 15 mm×15 mm in height and width (which are perpendicular to the axial direction thereof), and 20 mm in long (in the axial direction thereof).

Next, the test sample was inserted into a measurement chamber of the mercury porosimeter, and a pressure of the measurement chamber was reduced. After the pressure reduction in the measurement chamber, a mercury was introduced into the measurement chamber, and a pressure in the measurement chamber was increased. The pore diameter and the pore volume of each test sample were detected on the basis of the increased pressure and a volume of the mercury introduced into the measurement chamber.

The detection of the pore diameter and the pore volume of each test sample were performed under a pressure within a range of 0.5 psia to 20000 psia. For example, 0.5 psia corresponds to 0.35×10⁻³ kg/mm², and 20000 psia corresponds to 14 kg/mm². The pressure range of 0.5 psia to 20000 psia corresponds to a pore diameter range of 0.01 to 420 μm. The calculation of the pore diameter from the pressure used a contact angle constant of 140° and a surface tension constant of 480 dyn/cm. The average pore diameter represents a pore diameter at 50% integrated value of the pore volume. The porosity was calculated by using the following formula.

Porosity (%)=overall pore volume/(overall pore volume+1/true specific gravity of cordierite)×100.

[Number of Communicating Pores and Curve Ratio L/T (Before Catalyst Support)]

Before the catalyst support, i.e. before the catalyst 2 was supported in each test sample as the honeycomb structure body, the number of the communicating pores formed in the partition walls and the curve ratio L/T were measured by the binarization process of CT scan images, explained in the first exemplary embodiment.

The binarization process of CT scan images in a scan direction S was performed by using the ImageJ ver. 1.46 as the Java-based image processing program (developed at the NIH, National Institutes of Health and the Laboratory for Optical and Computational Instrumentation.)

After the binarization process, the length of the pore passage of the pores was measured by using the IGORL ver. 6.0.3.1 manufactured by HULINKS Inc.

The line thinning process of the pores 121 obtained from the binarized CT scan images is performed.

In order to calculate the curve ratio LIT, the pore passage length was calculated by using the analysis software Geo-Dict® ver. 2017 produced by the SCSK Corporation.

FIG. 15 to FIG. 20 are views showing the frequency histogram of the pore passage lengths in respective test samples H2 to H7.

[Deterioration Rate of PM Collection Rate and Deterioration Rate of Pressure Loss]

After the inside of the partition walls were filled with the slurry containing catalyst, the catalyst with slurry was sucked from one end surface or both end surfaces of the honeycomb structure bodies as test samples H1 to H12 so as to support the catalyst in the pores of the partition walls in the honeycomb structure bodies as test samples H1 to H12 by using the known in-wall coating method. The support amount of the catalyst was 60 g/liter.

The second experiment measured the PM collection rate and the pressure loss before and after the catalyst support in each of test samples H1 to H12.

Specifically, the second experiment measured the PM collection rate and the pressure loss by the following process.

Each of the honeycomb structure bodies as test samples H1 to H12 before and after the catalyst support was mounted on an exhaust gas pipe of a gasoline direct injection engine. The second experiment supplied exhaust gas containing PM into each of the honeycomb structure bodies while measuring the amount of PM contained in exhaust gas discharged from each of the honeycomb structure bodies as test samples H1 to H12. The second experiment calculated the PM collection rate of each test sample on the basis of the amount of PM. The measurement conditions were 450° C. in temperature, and 2.8 m³/min in flow amount of the exhaust gas. Simultaneously, the second experiment detected a pressure of the front side and a pressure of the rear side of each test sample, and calculated the pressure loss of each test sample on the basis of a pressure difference between the front side and the rear side of each test sample. The measurement conditions were 720° C. in temperature, and 11.0 m³/min in flow amount of the exhaust gas. The second experiment performed these measurements in the initial state of test samples H1 to H12, where the initial state represents a condition in which no PM is accumulated in each of test samples H1 to H12.

The amount of PM contained in exhaust gas was calculated by using a PM particle counter manufactured by AVL Corp.

The second experiment calculated an absolute value of (100×(PM collection rate [%] after catalyst support−PM collection rate [%] before catalyst support)/(PM collection rate [%] before catalyst support). The second experiment determined the calculated absolute value as the deterioration of the PM collection rate of each test sample.

Further, the second experiment calculated an absolute value of (100×(Pressure loss [kPa] after catalyst support−Pressure loss [kPa] before catalyst support)/(Pressure loss [kPa] before catalyst support). The second experiment determined the calculated absolute value as the deterioration rate of the pressure loss of each test sample.

Table 6 shows the calculation results of the deterioration rate of the PM collection rate and the deterioration rate of the pressure loss of test samples H1 to H12.

Figure 21:
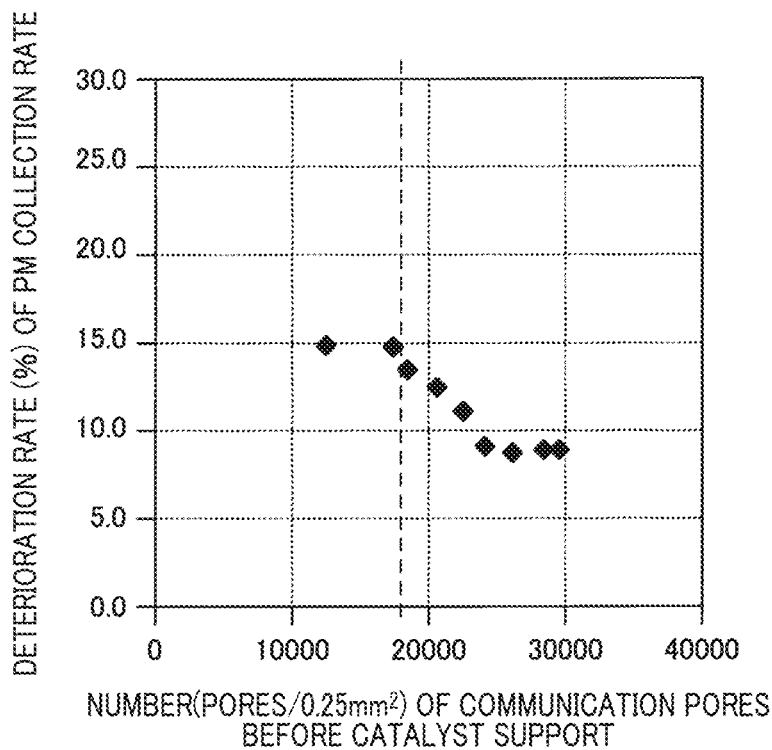
FIG. 21 is a view showing a relationship between the number of communicating pores and a deterioration rate of a PM collection rate of a honeycomb structure body before a catalyst support in the honeycomb structure body according to the second experiment.
Figure 22:
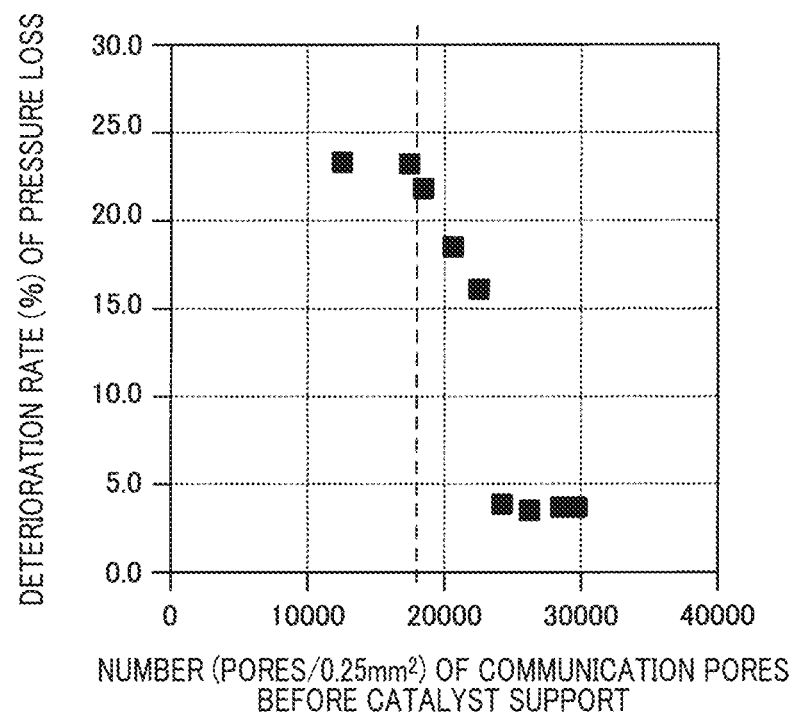
FIG. 22 is a view showing a relationship between the number of communicating pores and a deterioration rate of a pressure loss of a honeycomb structure body before the catalyst support in the honeycomb structure body according to the second experiment.

FIG. 21 is a view showing a relationship between the number of the communicating pores and the deterioration rate of the PM collection rate of test samples before catalyst support. FIG. 22 is a view showing a relationship between the number of the communicating pores and the deterioration rate of the pressure loss of test samples before catalyst support.

ture makes it possible to suppress deterioration of the PM collection rate and the pressure loss after the catalyst support.

Further, as shown in FIG. 21 and FIG. 22, it can be understood that test samples having the communicating pores of less than 18000 [pores/0.25 mm$^2$] before the catalyst support had a high deterioration rate of both the PM collection rate and the pressure loss. This means that the communicating pores are clogged with the catalyst in a honeycomb structure body in which the number of the communicating pores was within a range of less than 18000 [pores/0.25 mm$^2$] before the catalyst support, and the clogged communicating pores prevent exhaust gas from easily flowing therein. As a result, the deterioration rate of the PM collection rate and the pressure loss becomes high. In other words, the catalyst support process reduces the total number of the communicating pores capable of allowing exhaust gas to easily flow, and provides a less number of the communicating pores to allow exhaust gas to easily flow therein.

Further, as shown in FIG. 21 and FIG. 22, when test samples having the communicating pores at a density of not less than 18000 [pores/0.25 mm$^2$] before the catalyst support have a low deterioration rate of the PM collection art and the pressure loss. This means that test samples having a large

TABLE 6

| | BEFORE CATALYST SUPPORT PROCESS | | | | | |
|---|---|---|---|---|---|---|
| | THICKNESS (μm) OF PARTITION WALL | POROSITY (%) | AVERAGE PORE DIAMETER (μm) | NUMBER OF COMMUNICATION PORES (PORES/0.25 mm$^2$) | CURVE RATIO L/T (—) | DETERIORATION RATE (%) OF PM COLLECTION RATE | DETERIORATION RATE (%) OF PRESSURE LOSS |
| TEST SAMPLE H1 | 280 | 59 | 25 | 26221 | 1.35 | 8.8 | 3.6 |
| TEST SAMPLE H2 | 190 | 63 | 30 | 17455 | 1.81 | 14.8 | 23.2 |
| TEST SAMPLE H3 | 280 | 66 | 19 | 12556 | 1.13 | 15.1 | 23.3 |
| TEST SAMPLE H4 | 240 | 65 | 14 | 28519 | 1.21 | 8.9 | 3.7 |
| TEST SAMPLE H5 | 280 | 65 | 17 | 22577 | 1.26 | 11.1 | 16.1 |
| TEST SAMPLE H6 | 240 | 65 | 16 | 24165 | 1.25 | 9.1 | 3.9 |
| TEST SAMPLE H7 | 210 | 61 | 19 | 20663 | 1.34 | 12.5 | 18.5 |
| TEST SAMPLE H8 | 280 | 58.5 | 16 | 29628 | 1.28 | 8.9 | 3.7 |
| TEST SAMPLE H9 | 280 | 62 | 17 | 18515 | 1.44 | 13.5 | 21.8 |
| TEST SAMPLE H10 | 280 | 64 | 16 | 19034 | 1.03 | 12.3 | 17.3 |
| TEST SAMPLE H11 | 280 | 64 | 18 | 26800 | 1.1 | 9.5 | 3.7 |
| TEST SAMPLE H12 | 280 | 64 | 17 | 28050 | 1.04 | 9.0 | 1.5 |

The following matters can be understood from the results of the second experiment shown in Table 6.

Before the catalyst support, test sample H2 and test sample H3 have the number of the communicating pores of less than 18000 [pores/0.25 mm$^2$]. After the catalyst support, each of test samples H2 and H3 had a high deterioration rate of both the PM collection rate and the pressure loss. On the other hand, as compared with those of test samples H2 and H3, each of test samples H1, and H4 to H12 had a low deterioration rate of both the PM collection rate and the pressure loss after the catalyst support. That is, as compared with the structure of test samples H2 and H3, the structure of each of test samples H1, and H4 to H12 makes it possible to suppress deterioration of the PM collection rate and the pressure loss after the catalyst support.

Because the total number of the communicating pores in test samples H1, and H4 to H12 had a density of not less than 18000 [pores/0.25 mm$^2$] after the catalyst support, a catalyst amount supported by each communicating pore was reduced, and the number of the communicating pores, which were clogged with the catalyst, became reduced. This strucnumber of the communicating pores, at a density of not less than 18000 [pores/0.25 mm$^2$] have the communicating pores with no catalyst before the catalyst support, an absolute value of each of the PM collection rate and the pressure loss thereof increases, and the PM collection rate and the pressure loss are increased due to the presence of the communicating pores without catalyst. That is, the presence of the communicating pores without catalyst reduces the deterioration rate of the PM collection rate and the pressure loss. Because the deterioration of the PM collection rate and the pressure loss occurs due to the flow of exhaust gas, the saturation of the deterioration rate of both the PM collection rate and the pressure loss is determined due to a degree in flow of exhaust gas.

Third Experiment

A description will be given of a third experiment with reference to experimental results shown in Table 7 and FIG. 23.

The third experiment used test sample F1 to F12 as exhaust gas purification filters, which correspond to respective test samples H1 to H12 with catalyst of 60 g/L.

Similar to the second experiment previously described using the method shown in the first exemplary embodiment, the parameters such as the porosity, average particle diameter, the number of the communicating pores, and the curve ratio L/T of each of test samples F1 to F12 were measured and calculated. Table 7 shows the results of those parameters of test samples F1 to F12. The deterioration rate of both the PM collection rate and the pressure loss obtained in the second experiment are shown again in Table 7. Further, Table 7 also shows a nitrogen oxides (NOx) purification rate of test samples F1 to F12, which will be explained in the fourth experiment.

Figure 23:
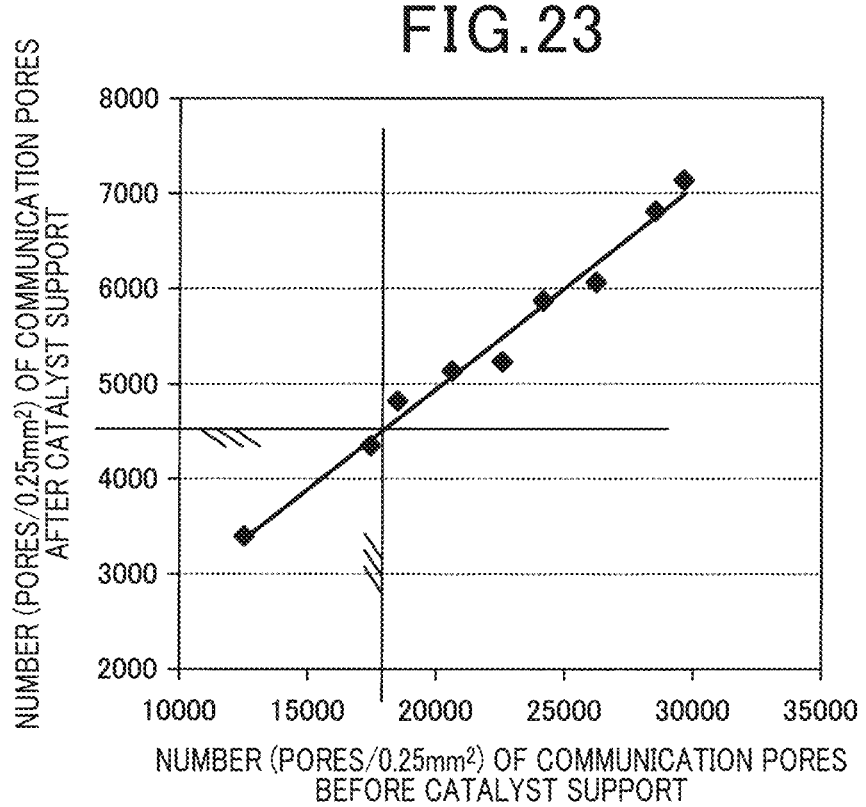
FIG. 23 is a view showing a relationship between the number of communicating pores before the catalyst support and the number of communicating pores after the catalyst support in test samples.

On the basis of the results of the second experiment and the results of the third experiment, FIG. 23 shows a relationship between the number of the communicating pores before the catalyst support and the number of the communicating pores after the catalyst support in test samples F1 to F12.

between the detected curve ratio LIT, the thickness of the catalyst layer and the NOx purification capability.

Figure 24:
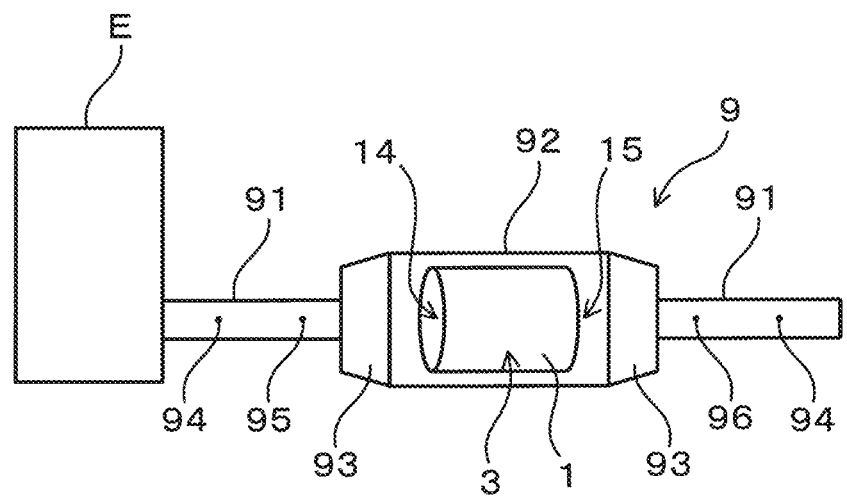
FIG. 24 is a view explaining a method of detecting a NOx purification rate of test samples according to a fourth experiment.

FIG. 24 is a view explaining a method of detecting the NOx purification rate of test samples as the exhaust gas purification filter according to the fourth experiment.

As shown in FIG. 24, the fourth experiment used an evaluation converter composed of exhaust gas pipes 91, a casing 92 which accommodated each test sample, corn parts 93 connected the casing 92 with the exhaust gas pipes 91.

The exhaust gas pipes 91 are composed of the upstream-side pipe and the downstream-side pipe. The upstream-side pipe was joined to an engine E which emitted exhaust gas. The engine E is a natural intake type engine having a four cylinders and a displacement of 2.0 liter.

As shown in FIG. 24, an air/fuel (A/F) sensor 94 and a gas concentration sensor 95 were mounted to the upstream-side

TABLE 7

| | | AFTER CATALYST SUPPORT PROCESS | | | | | |
|---|---|---|---|---|---|---|---|
| | POROSITY (%) | AVERAGE PORE DIAMETER ) (μm) | NUMBER OF COMMUNICATION PORES (PORES/0.25 mm$^2$) | CURVE RATIO L/T (—) | DETERIORATION RATE (%) OF PM COLLECTION RATE | DETERIORATION RATE (%) OF PRESSURE LOSS | NOx PURICATION RATE (%) |
| TEST SAMPLE F1 | 50 | 23 | 6062 | 1.57 | 8.8 | 3.6 | 99.7 |
| TEST SAMPLE F2 | 54 | 28 | 4349 | 2.10 | 14.8 | 23.2 | 85.0 |
| TEST SAMPLE F3 | 57 | 17 | 3399 | 1.31 | 15.1 | 23.3 | 83.5 |
| TEST SAMPLE F4 | 56 | 12 | 6811 | 1.40 | 8.9 | 3.7 | 98.4 |
| TEST SAMPLE F5 | 56 | 15 | 5232 | 1.47 | 11.1 | 16.1 | 97.5 |
| TEST SAMPLE F6 | 56 | 14 | 5871 | 1.45 | 9.1 | 3.9 | 98.6 |
| TEST SAMPLE F7 | 52 | 17 | 5135 | 1.55 | 12.5 | 18.5 | 98.9 |
| TEST SAMPLE F8 | 49.5 | 14 | 7136 | 1.48 | 8.9 | 3.7 | 99.2 |
| TEST SAMPLE F9 | 53 | 15 | 4822 | 1.67 | 13.5 | 21.8 | 98.6 |
| TEST SAMPLE F10 | 52 | 14 | 4583 | 1.19 | 12.3 | 17.3 | 82.1 |
| TEST SAMPLE E11 | 58 | 16 | 6796 | 1.28 | 9.5 | 3.7 | 86.2 |
| TEST SAMPLE F12 | 55 | 15 | 7013 | 1.21 | 9.0 | 1.5 | 87.4 |

As comparing the results shown in Table 7 with the results shown in Table 6, because test samples H1 to H17 has supported the catalyst and the amount of which was 60 g/L, the total number of the communicating pores not clogged with the catalyst was reduced after the catalyst support. As a result, the curve ratio LIT increases because of correlating with a short length passage formed by the unclogged communicating pores. The more the catalyst amount increases, the more the curve ratio L/T increases. On the other hand, the more the catalyst amount is reduced, the more the curve ratio L/T is reduced.

As shown in FIG. 23, it can be understood that the number of the communicating pores before the catalyst support and the number of the communicating pores after the catalyst support have the positive correlation. From the results shown in Table 7, it is possible for the exhaust gas purification filter to have the communicating pores at a density of not less than 4500 [pores/0.25 mm$^2$] which are not clogged after the catalyst support when having the communicating pores at a density of not less than 18000 [pores/0.25 mm$^2$] before the catalyst support.

Fourth Experiment

A description will be given of a fourth experiment with reference to experimental results shown in FIG. 24 to FIG. 27.

The fourth experiment used test samples H1 to H12, shown in the third experiment as the exhaust gas purification filter, and detected the curve ratio LIT before the catalyst support, the thickness of the catalyst layer after the catalyst support, and the NOx purification capability of each test sample. The fourth experiment detected the relationship pipe in the exhaust gas pipes 91. Further, a gas concentration sensor 96 was mounted to the downstream-side pipe in the exhaust gas pipes 91. The gas concentration sensor 95 and the gas concentration sensor 96 are MEXA-7500 manufactured by HORIBA Ltd.

The NOx purification rate was detected under the condition in which A/F was 14.4, the inlet air amount was 50 g/s, and a rotation speed of the engine E was 3500 rpm (revolutions per minute).

The fourth experiment calculated the purification rate of Nitrogen Oxides (NOx), i.e. the NOx purification rate of each test sample on the basis of the following formula.

NOx purification rate=100×(NOx concentration [ppm] detected by the gas concentration sensor 95–NOx concentration [ppm] detected by the gas concentration sensor 96)/(NOx concentration [ppm] detected by the gas concentration sensor 95).

Further, the fourth experiment calculated the thickness of the catalyst layer of each test sample by using the following formula on the basis of the average pore diameter obtained by the mercury press-in method explained in the first exemplary embodiment and the second experiment.

Thickness of catalyst layer=0.5×(average pore diameter before the catalyst support–average pore diameter after the catalyst support).

The increasing of the number of the communicating pores improves the area capable of supporting catalyst. The number of effective communicating pores is due to the curve ratio L/T before the catalyst support, where the effective communicating pores are capable of supporting a necessary amount of catalyst therein and capable of providing a necessary thickness of the catalyst layer adequately collecting PM such as NOx and purifying exhaust gas.

Figure 25:
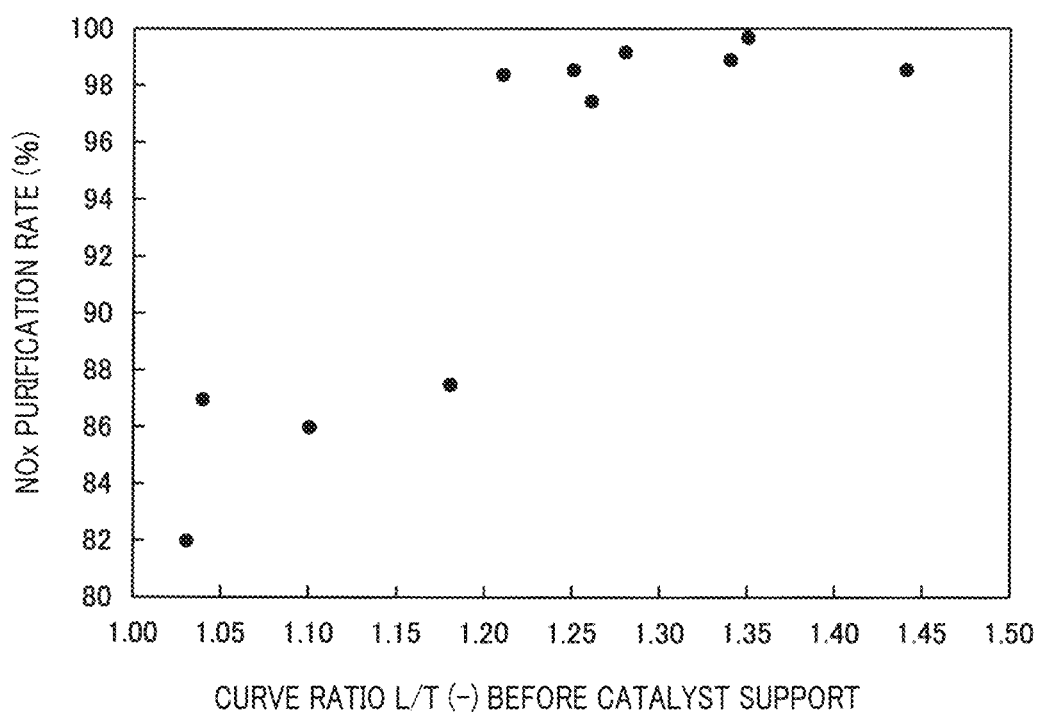
FIG. 25 is a view showing a relationship between a curve ratio and the NOx purification rate before the catalyst support in test samples according to the fourth experiment.

FIG. 25 is a view showing a relationship between a curve ratio and the NOx purification rate before the catalyst support in test samples according to the fourth experiment. As shown in FIG. 25, when having a low curve ratio L/T before the catalyst support, test sample has a tendency of reducing the NOx purification performance thereof as the exhaust gas purification filter.

Figure 26:
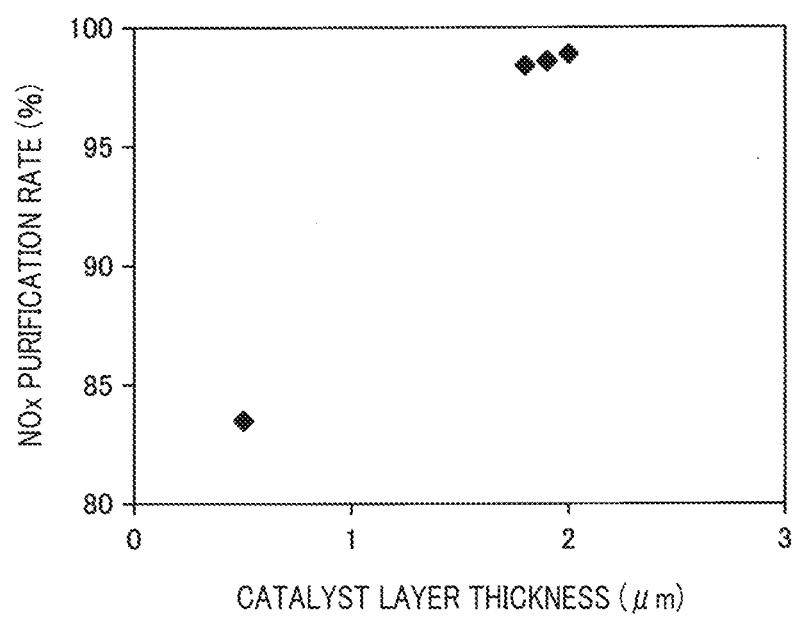
FIG. 26 is a view showing a relationship between a thickness of a catalyst layer and the NOx purification rate of test samples according to the fourth experiment.

FIG. 26 is a view showing a relationship between the thickness of the catalyst layer and the NOx purification rate of test samples according to the fourth experiment. As shown in FIG. 26, when having a low thickness of the catalyst layer, test sample has a tendency of reducing the NOx purification performance thereof as the exhaust gas purification filter because exhaust gas containing NOx is not diffused into the catalyst layer.

Figure 27:
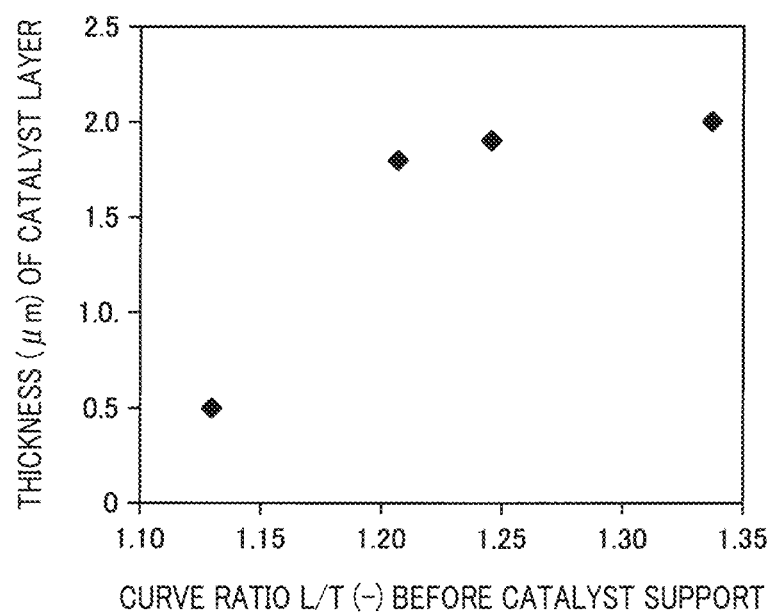
FIG. 27 is a view showing a relationship between the curve ratio and the thickness of a catalyst layer in test samples before the catalyst support according to the fourth experiment.

FIG. 27 is a view showing a relationship between the curve ratio and the thickness of a catalyst layer in test samples before the catalyst support according to the fourth experiment. As shown in FIG. 27, when the curve ratio LIT is reduced before the catalyst support, and a passage resistance of the communicating pores is reduced, the catalyst support capability is reduced during the process of the catalyst support, test sample has a tendency of having a thin catalyst layer.

Accordingly, it is preferable for the exhaust gas purification filter to have the curve ratio LIT at a value of not less than 1.2 so as to provide the improved NOx purification capability on the basis of the results shown in FIG. 25, FIG. 26 and FIG. 27.

Further, the reason why the preferable curve ratio L/T is a value of not less than 1.2 is that a necessary reaction time between catalyst and NOx as PM contained in exhaust gas is a constant physical value. Accordingly, it is possible for the catalyst layer having a necessary thickness to provide the communicating pore passage having a necessary pore passage length in the partition walls. The communicating pore passages having the necessary pore passages allows the catalyst and NOx contained in exhaust gas to be completely reacted. Accordingly, the exhaust gas purification filter having the structure previously described can adequately purify exhaust gas.

Incidentally, as previously described in detail, the PM collection rate represents a degree of collecting PM from exhaust gas. The pressure loss is defined as a difference in pressure between the inlet part and the outlet part of the exhaust gas purification filter. In general, a related technique adjusts a diameter of pores (pore diameter) formed in partition walls before a catalyst support process, and adjusts a porosity of the partition walls and a distribution of the pores in the partition walls before the catalyst support process in order to suppress deterioration of both the PM collection rate and the pressure loss of the exhaust gas purification filter.

Another technique has been proposed, which adjusts an interior structure of the partition walls in a porous structure which form the cell in order to increase and improve the PM collection rate. A related art technique limits a total length of a pore network composed of thinned lines extracted from a three dimensional network (3D network) formed in a ceramic part composed of partition walls arranged in a honeycomb structure so that the total length of the 3D network becomes not less than 2200 mm/m$^3$. This structure of the exhaust gas purification filter collects PM from exhaust gas with high efficiency.

However, the related art technique does not always suppress or reduce the deterioration of the PM collection rate and the pressure loss. In other words, it is difficult for the related art technique to suppress the deterioration of the PM collection rate and the pressure loss after the catalyst support process, i.e. after catalyst has been supported in the pores of the honeycomb structure body because the related art technique adjusts only the pore diameter, the porosity and the distribution of pores in the partition walls before the catalyst support process. The reason why is as follows. Even 1$f$ the partition walls have the same pore diameter, the same porosity, and the same pore distribution, when non-communicating pores, i.e. closed pores are present in the partition walls, which prevent exhaust gas from flowing between cells adjacently arranged, it is difficult to feed slurry containing catalyst into the closed pores during the catalyst support process. Accordingly, it is difficult for the partition walls having such closed pores to support the catalyst. Further, during the catalyst support process, a large amount of the slurry containing catalyst, which is not fed into the closed pores, is fed into the communicating pores. That is, an excess amount of the slurry is fed into the communicating pores during the catalyst support process, and the communicating pores are clogged with the slurry with the catalyst. This increases the number of the clogged communicating pores, and as a result reduces the PM collection rate and the pressure loss of the exhaust gas purification filter. As a result, it becomes difficult to suppress the deterioration of the PM collection rate and the pressure loss of the exhaust gas purification filter.

The related art previously described adjust the interior structure of the partition walls so as to increase the PM collection rate. The related art technique previously described selects a countermeasure to increase the total length of the pore network composed of thinned line passages in the 3D network extracted from the images of ceramics forming the partition walls in the honeycomb structure body so as to increase the PM collection rate. In other words, the related art technique previously described does not consider maintaining effective pores in partition walls before and after the catalyst support process, and does not consider avoiding the deterioration of the PM collection rate and the pressure loss caused by reduction of the number of the effective pores during the catalyst support process.

On the other hand, as previously described in detail, the present disclosure has solved the related art problem and provides the honeycomb structure body having the improved structure in which the communicating pores have a density at not less than 18000 [pores/0.25 mm$^2$] as a specific value. The communicating pores have a density which corresponds to the number of the communicating pores.

Accordingly, because the honeycomb structure body has the communicating pores and the density of the communicating pores, i.e. which corresponds to the number of the communicating pores, is not less than the specific value, (the communicating pores having a function of supporting catalyst), this structure makes it possible to suppress deterioration of the PM collection rate and the pressure loss even 1$f$ catalyst is supported in the honeycomb structure body so as to be used as an exhaust gas purification filter.

The reason why those improved effects are obtained is as follows. In general, the deterioration of the PM collection rate and the pressure loss occurs due to increasing of the number of the clogged pores when an excess amount of catalyst is supplied to the pores, and the pores are clogged with the excess catalyst. In order to avoid the deterioration of the PM collection rate and the pressure loss, it is preferable to prevent the formation of the clogged communicating pores, i.e. to reduce the total number of the clogged communicating pores when the catalyst is supported.

During the catalyst support process, the catalyst is fed into the communicating pores, and on the other hand, no catalyst is fed into non-communicating pores, i.e. closed pores. That is, after the catalyst support process, the catalyst is supported in the communicating pores only, and no catalyst is supported in the closed pores.

Accordingly, when the supply amount of the catalyst does not vary, i.e. is constant, and the total number of the communicating pores increases, an amount of the catalyst per communicating pore is reduced during the catalyst support process, and the total number of the clogged communicating pores is reduced. Because the communicating pores, which are not clogged with the catalyst and allow exhaust gas to flow between the adjacently-arranged cells, increases, it is possible to prevent the deterioration of the PM collection rate and the pressure loss.

Because the exhaust gas purification filter according to the present disclosure has the improved structure previously described, it is possible to suppress the deterioration of the PM collection rate and the pressure loss due to the catalyst support.

While specific embodiments of the present disclosure have been described in detail, it will be appreciated by those skilled in the art that various modifications and alternatives to those details could be developed in light of the overall teachings of the disclosure. Accordingly, the particular arrangements disclosed are meant to be illustrative only and not limited to the scope of the present disclosure which is to be given the full breadth of the following claims and all equivalents thereof.

What is claimed is:

1. A honeycomb structure body comprising:
   an outer skin;
   a plurality of cells arranged in an inside of the outer skin; and
   a plurality of partition walls comprising pores,
   the partition walls arranged in the inside of the outer skin and forming the plurality of cells,
   the pores comprising communicating pores, which communicate with adjacently located cells and through which exhaust gas passes between the adjacently located cells, and the communicating pores have a density at not less than 18000 [pores/0.25 mm$^2$].

2. The honeycomb structure body according to claim 1, wherein
   the pores formed in the partition walls have an average pore diameter within a range of not less than 12 μm and not more than 30 μm, and the partition walls have a porosity within a range of not less than 55% and not more than 75%.

3. The honeycomb structure body according to claim 2, wherein
   the partition walls have a curve ratio L/T at a value of not less than 1.2, where L/T indicates a ratio of a thickness T (μm) of the partition walls to an average passage length L (μm) of the communicating pores formed in the partition walls.

4. The honeycomb structure body according to claim 1, wherein
   the partition walls have a curve ratio LIT at a value of not less than 1.2, where L/T indicates a ratio of a thickness T (μm) of the partition walls to an average passage length L (μm) of the communicating pores formed in the partition walls.

5. An exhaust gas purification filter comprising:
   the honeycomb structure body according to claim 1; and
   catalyst supported on pore walls of the communicating pores.

6. The exhaust gas purification filter according to claim 5, wherein
   the pore walls support the catalyst at not less than 30 g/liter.

7. The exhaust gas purification filter according to claim 6, wherein
   after the catalyst has been supported on the pore walls, the communicating pores which are not clogged with the catalyst have a density at not less than 4500 [pores/0.25 mm$^2$].

8. The exhaust gas purification filter according to claim 6, wherein
   after the catalyst has been supported on the pore walls, the partition walls have an average pore diameter within a range of not less than 10 μm and not more than 28 μm, and have the porosity within a range of not less than 46% and not more than 66%.

9. The exhaust gas purification filter according to claim 6, wherein
   after the catalyst has been supported on the pore walls, the partition walls has a curve ratio L/T at a value of not less than 1.4, wherein the curve ratio L/T is defined by a ratio of a thickness T (μm) of the partition walls to an average passage length L (μm) of the communicating pores.

10. The exhaust gas purification filter according to claim 5, wherein
    after the catalyst has been supported on the pore walls, the communicating pores which are not clogged with the catalyst have a density at not less than 4500 [pores/0.25 mm$^2$].

11. The exhaust gas purification filter according to claim 5, wherein
    after the catalyst has been supported on the pore walls, the partition walls have an average pore diameter within a range of not less than 10 μm and not more than 28 μm, and have the porosity within a range of not less than 46% and not more than 66%.

12. The exhaust gas purification filter according to claim 5, wherein
    after the catalyst has been supported on the pore walls, the partition walls has a curve ratio L/T at a value of not less than 1.4, wherein the curve ratio L/T is defined by a ratio of a thickness T (μm) of the partition walls to an average passage length L (μm) of the communicating pores.

13. An exhaust gas purification filter comprising a honeycomb structure body and catalyst, wherein
    the honeycomb structure body comprises:
    an outer skin;
    a plurality of cells arranged in an inside of the outer skin; and
    a plurality of partition walls comprising pores, arranged in the inside of the outer skin and forming the plurality of cells, the pores comprising communicating pores, which communicate with each other adjacently arranged cells and through which exhaust gas passes between the adjacent cells, and wherein
the catalyst is supported on pore walls of the communicating pores,
the pore walls support the catalyst at not less than 30 g/liter, and
after the catalyst has been supported on the pore walls, the communicating pores which are not clogged with the catalyst have a density at not less than 4500 [pores/0.25 mm$^2$].

14. The exhaust gas purification filter according to claim 13, wherein
after the catalyst has been supported on the pore walls, the partition walls have an average pore diameter within a range of not less than 10 μm and not more than 28 μm, and have the porosity within a range of not less than 46% and not more than 66%.

15. The exhaust gas purification filter according to claim 14, wherein
after the catalyst has been supported on the pore walls, the partition walls has a curve ratio L/T at not less than 1.4, wherein the curve ratio L/T is defined by a ratio of a thickness T (μm) of the partition walls to an average passage length L (μm) of the communicating pores.

16. The exhaust gas purification filter according to claim 13, wherein
after the catalyst has been supported on the pore walls, the partition walls has a curve ratio LIT at not less than 1.4, wherein the curve ratio L/T is defined by a ratio of a thickness T (μm) of the partition walls to an average passage length L (μm) of the communicating pores.

* * * * *